United States Patent
Sakai

(10) Patent No.: US 10,951,887 B2
(45) Date of Patent: Mar. 16, 2021

(54) IMAGING APPARATUS, PROCESSING METHOD FOR IMAGING APPARATUS, AND STORAGE MEDIUM

(71) Applicant: CANON KABUSHIKI KAISHA, Tokyo (JP)

(72) Inventor: Tomohiro Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 16/010,154

(22) Filed: Jun. 15, 2018

(65) Prior Publication Data

US 2018/0367792 A1 Dec. 20, 2018

(30) Foreign Application Priority Data

Jun. 20, 2017 (JP) .............. JP2017-120595

(51) Int. Cl.
| | | |
|---|---|---|
| *H04N 19/107* | (2014.01) | |
| *H04N 19/146* | (2014.01) | |
| *H04N 21/235* | (2011.01) | |
| *H04N 19/172* | (2014.01) | |
| *H04L 29/06* | (2006.01) | |

(Continued)

(52) U.S. Cl.
CPC ......... *H04N 19/107* (2014.11); *H04L 65/607* (2013.01); *H04N 19/146* (2014.11); *H04N 19/164* (2014.11); *H04N 19/172* (2014.11); *H04N 21/2187* (2013.01); *H04N 21/231* (2013.01); *H04N 21/2353* (2013.01); *H04N 21/23439* (2013.01); *H04N 21/6125* (2013.01); *H04N 21/8456* (2013.01)

(58) Field of Classification Search
CPC .. H04N 19/107; H04N 19/146; H04N 19/164; H04N 19/172; H04N 21/2187
See application file for complete search history.

(56) References Cited

U.S. PATENT DOCUMENTS

| 7,178,159 | B1 * | 2/2007 | Ando ............... G06T 9/004 375/E7.016 |
| 2007/0009029 | A1 * | 1/2007 | Craig ............ H04N 21/6377 375/240.12 |

(Continued)

FOREIGN PATENT DOCUMENTS

| CN | 101803291 A | 8/2010 |
| CN | 102428698 A | 4/2012 |

(Continued)

*Primary Examiner* — Jonathan R Messmore
(74) *Attorney, Agent, or Firm* — Canon U.S.A., Inc. IP Division

(57) ABSTRACT

There is provided an imaging apparatus including a distribution unit configured to distribute a playlist, in which information relating to a plurality of moving image streams can be described, when a distribution request of the playlist is received, and a coding unit configured to encode a moving image frame corresponding to a moving image stream described in the playlist through intraframe coding before receiving a distribution request of a specific moving image stream when the distribution request of the playlist is received, wherein, when the distribution request of the specific moving image stream is received, the distribution unit distributes a moving image stream corresponding to the specific moving image stream including the moving image frame encoded through intraframe coding.

9 Claims, 16 Drawing Sheets

(51) Int. Cl.
*H04N 19/164* (2014.01)
*H04N 21/231* (2011.01)
*H04N 21/2187* (2011.01)
*H04N 21/2343* (2011.01)
*H04N 21/845* (2011.01)
*H04N 21/61* (2011.01)

(56) References Cited

U.S. PATENT DOCUMENTS

| | | | |
|---|---|---|---|
| 2012/0278833 A1 | 11/2012 | Tam | |
| 2013/0343463 A1* | 12/2013 | Terada | H04N 19/463 375/240.18 |
| 2014/0282766 A1 | 9/2014 | Good | |
| 2014/0372624 A1* | 12/2014 | Wang | H04L 69/18 709/231 |
| 2014/0380376 A1 | 12/2014 | Schmidt et al. | |
| 2015/0341689 A1* | 11/2015 | Burkitt | H04N 21/431 725/34 |
| 2016/0142750 A1* | 5/2016 | Huber | H04L 65/605 725/116 |
| 2016/0295254 A1* | 10/2016 | Chen | H04N 21/23406 |
| 2016/0323358 A1* | 11/2016 | Malhotra | G06F 16/182 |
| 2017/0339415 A1* | 11/2017 | Wang | H04N 21/84 |
| 2017/0366833 A1* | 12/2017 | Amidei | H04L 65/4092 |
| 2018/0097864 A1* | 4/2018 | Brinkley | H04L 65/4084 |

FOREIGN PATENT DOCUMENTS

| | | |
|---|---|---|
| CN | 103873882 A | 6/2014 |
| CN | 104539948 A | 4/2015 |
| CN | 104735470 A | 6/2015 |
| CN | 106537923 A | 3/2017 |
| EP | 3107261 A1 | 12/2016 |
| JP | 2002-344932 A | 11/2002 |
| JP | 2016-531466 A | 10/2016 |

* cited by examiner

FIG.4

```
<?xml version="1.0"?>
<MPD
    xmlns:xsi="http://www.w3.org/2001/XMLSchema-instance" xmlns="urn:mpeg:dash:schema:mpd:2011"
    xsi:schemaLocation="urn:mpeg:DASH:schema:MPD:2011 DASH-MPD.xsd"
    profiles="urn:mpeg:dash:profile:isoff-live:2011" minimumUpdatePeriod="PT2S"
    timeShiftBufferDepth="PT30M" availabilityStartTime="2017-04-25T17:00:00"
    minBufferTime="PT4S" type="dynamic" >
    <BaseURL>http://192.169.100.1:80/video/</BaseURL>

<Period id="0" start="0">
      <AdaptationSet id="0" segmentAlignment="true">
        <Representation id="1" mimeType="video/mp4" codecs="avc1.4D401F"
          width="480" height="270" frameRate="30" bandwidth="680000">
          <BaseURL>/stream1</BaseURL>
          <SegmentTemplate timescale="3000" duration="300"
            media="/media1_$Number$.m4s" startNumber="1" initialization="/init1.mp4"/>
        </Representation>
        <Representation id="2" mimeType="video/mp4" codecs="avc1.4D401F"
          width="960" height="540" framerate="30" bandwidth="1360000">
          <BaseURL>/stream2</BaseURL>
          <SegmentTemplate timescale="3000" duration="14000"
            media="/media2_$Number$.m4s" startNumber="1" initialization="/init2.mp4"/>
        </Representation>
        <Representation id="3" mimeType="video/mp4" codecs="avc1.4D401F"
          width="3840" height="2150" frameRate="15" bandwidth="5680000">
          <BaseURL>/stream3</BaseURL>
          <SegmentTemplate timescale="3000" duration="14000"
            media="/media4_$Number$.m4s" startNumber="1" initialization="/init3.mp4"/>
        </Representation>
      </AdaptationSet>
    </Period>
</MPD>
```

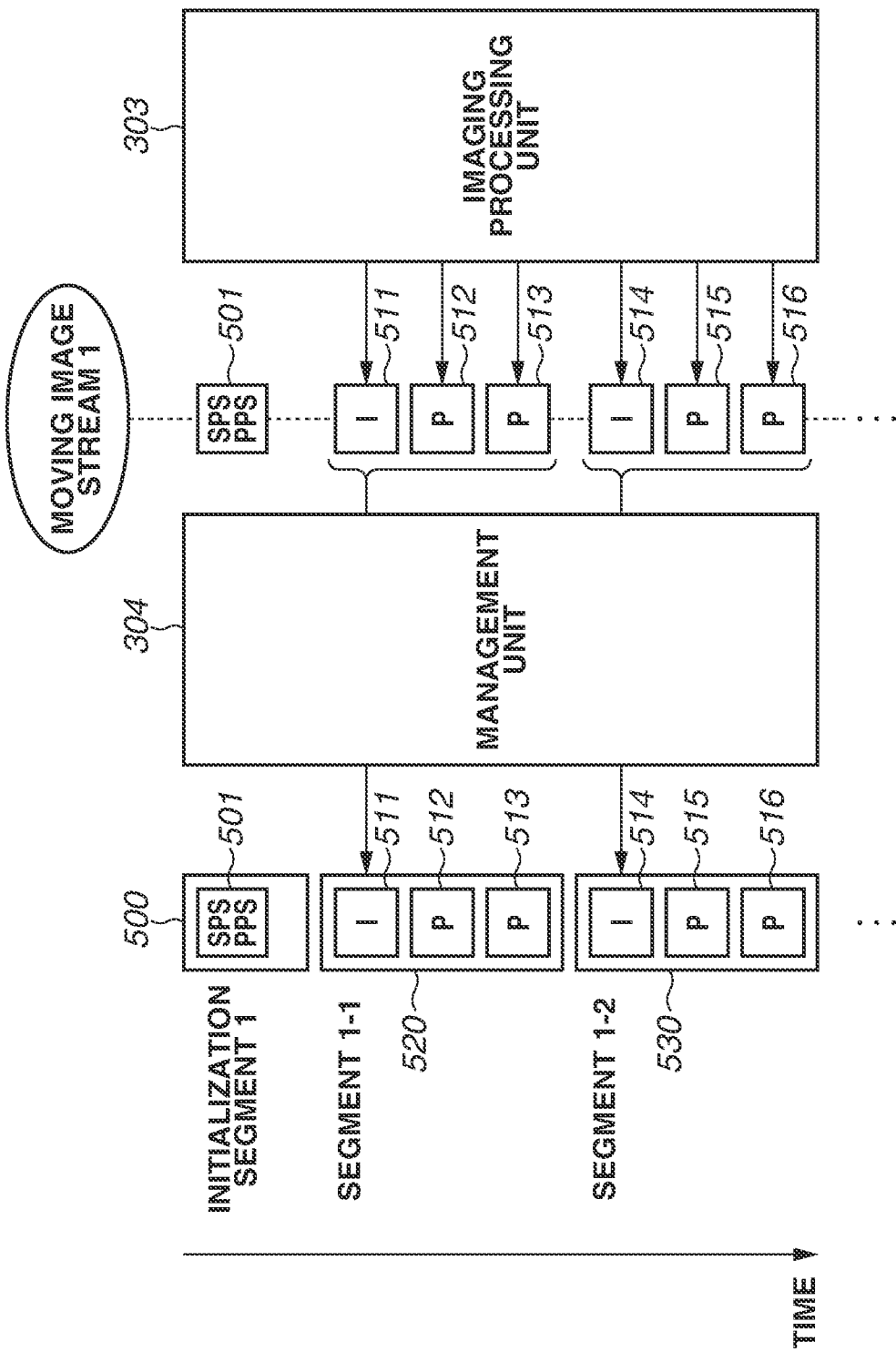

IMAGING APPARATUS, PROCESSING METHOD FOR IMAGING APPARATUS, AND STORAGE MEDIUM

BACKGROUND OF THE INVENTION

Field of the Invention

The present invention relates to an imaging apparatus, a processing method for the imaging apparatus, and a storage medium.

Description of the Related Art

In recent years, a system using an adaptive streaming technique for adjusting image quality and distributing a moving image according to a communication status of a client has become popular. There are two techniques as typical examples of the adaptive streaming technique. The first technique is the Dynamic Adaptive Streaming over HTTP (DASH) standardized by the Moving Picture Experts Group (MPEG). The second technique is the HTTP Live Streaming (HLS). In the above techniques, a Hypertext Transfer Protocol (HTTP) is used as a communication method, and a distribution server divides a moving image stream into a plurality of moving image files called segments and distributes the segments to a client.

More specifically, in DASH distribution, first, a client acquires a media presentation description (MPD) file including information about moving image streams distributable by a distribution server. Then, the client selects a moving image stream having an appropriate resolution and/or a bit rate from among the moving image streams according to the display performance and/or communication condition of the client. Then, the client downloads and reproduces a moving image in a format of MPEG2-TS or MP4 in segment units according to a description of the MPD. With a moving image codec of a moving image in a format of MPEG2-TS and MP4, a moving image frame encoded through intraframe coding (i.e., I-frame) and a moving image frame encoded through interframe coding (i.e., P-frame and B-frame) are generated. The client starts reproducing a moving image from the I-frame.

According to a method discussed in Japanese Unexamined Patent Application Publication (Translation of PCT Application) No. 2016-531466, from among segments described in the MPD, a segment to be subsequently distributed to a client is announced before a distribution request of a moving image is received from the client, and a request of cancelling the distribution or a request of changing the distribution order is received from the client prior to the distribution. Further, according to a method discussed in Japanese Patent Application Laid-Open No. 2002-344932, in order to enable a client to promptly start reproducing a moving image, an I-frame is generated when a distribution request of the moving image is transmitted from the client.

However, in the method described in Japanese Unexamined Patent Application Publication (Translation of PCT Application) No. 2016-531466 and Japanese Patent Application Laid-Open No. 2002-344932, no attention is given to an imaging method of a moving image frame for live-style DASH distribution (DASH live distribution) using a system such as a network camera having an imaging unit and a distribution server. Therefore, it may increase a delay time for creating a segment including an I-frame necessary for the client to start reproducing the moving image.

Japanese Unexamined Patent Application Publication (Translation of PCT Application) No. 2016-531466 does not provide a description with respect to a case where a segment including an I-frame does not exist in a distribution server when the DASH live distribution to the client is started. In such a case, a delay time will be longer by a period in which the client waits for the distribution server to newly create a segment including an I-frame to acquire the segment.

Further, in the method discussed in Japanese Patent Application Laid-Open No. 2002-344932, because the distribution server generates an I-frame after receiving a moving image distribution request from the client, a delay time will be longer by a period in which the client transmits the moving image distribution request to acquire a segment including an I-frame.

SUMMARY OF THE INVENTION

In order to decrease a delay time between reception of a distribution request of a moving image stream and distribution of the moving image stream, an imaging apparatus includes a distribution unit configured to distribute a playlist, in which information relating to a plurality of moving image streams can be described, when a distribution request of the playlist is received, and a coding unit configured to, when the distribution request of the playlist is received, encode a moving image frame corresponding to a moving image stream described in the playlist through intraframe coding before receiving a distribution request of a specific moving image stream, wherein, when the distribution request of the specific moving image stream is received, the distribution unit distributes a moving image stream corresponding to the specific moving image stream including the moving image frame encoded through intraframe coding.

Further features of the present invention will become apparent from the following description of exemplary embodiments with reference to the attached drawings.

BRIEF DESCRIPTION OF THE DRAWINGS

FIG. 4 is a diagram illustrating an example of a media presentation description (MPD) used for the Dynamic Adaptive Streaming over HTTP (DASH) live distribution.

FIG. 5 is a block diagram illustrating a relationship between a moving image frame and a segment.

DESCRIPTION OF THE EMBODIMENTS

Figure 1:
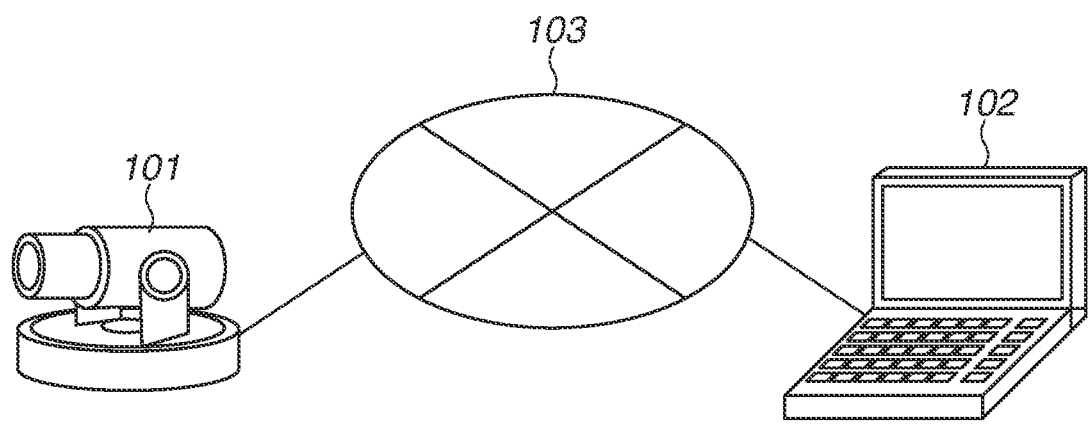
FIG. 1 is a diagram illustrating a configuration example of an imaging system according to a first exemplary embodiment.

FIG. 1 is a diagram illustrating a configuration example of an imaging system according to a first exemplary embodiment of the present disclosure. The imaging system includes an imaging apparatus 101, a client 102, and a network 103. For example, the imaging apparatus 101 may be a network camera, and the network 103 may be an internet protocol (IP) network such as a local area network (LAN). The imaging apparatus 101 and the client 102 are mutually connected and communicable via the network 103. The imaging apparatus 101 distributes a captured image to the client 102 via the network 103. The client 102 is an external device of the imaging apparatus 101. The client 102 transmits various request commands to the imaging apparatus 101. The imaging apparatus 101 transmits responses to these commands to the client 102. The network 103 includes a plurality of routers, switches, and cables which satisfy a communication standard such as Ethernet®. A communication standard, a scale, and a configuration thereof are not restricted as long as the network 103 allows communication between the imaging apparatus 101 and the client 102 to be executable. To the network 103, Networks from the internet to a wireless LAN are applicable. In addition, for the simplicity of the description, although one imaging apparatus 101 is illustrated in FIG. 1, a number of imaging apparatuses may be two or more. Further, there may be clients other than the client 102 that connect to the imaging apparatus 101.

Figure 2:
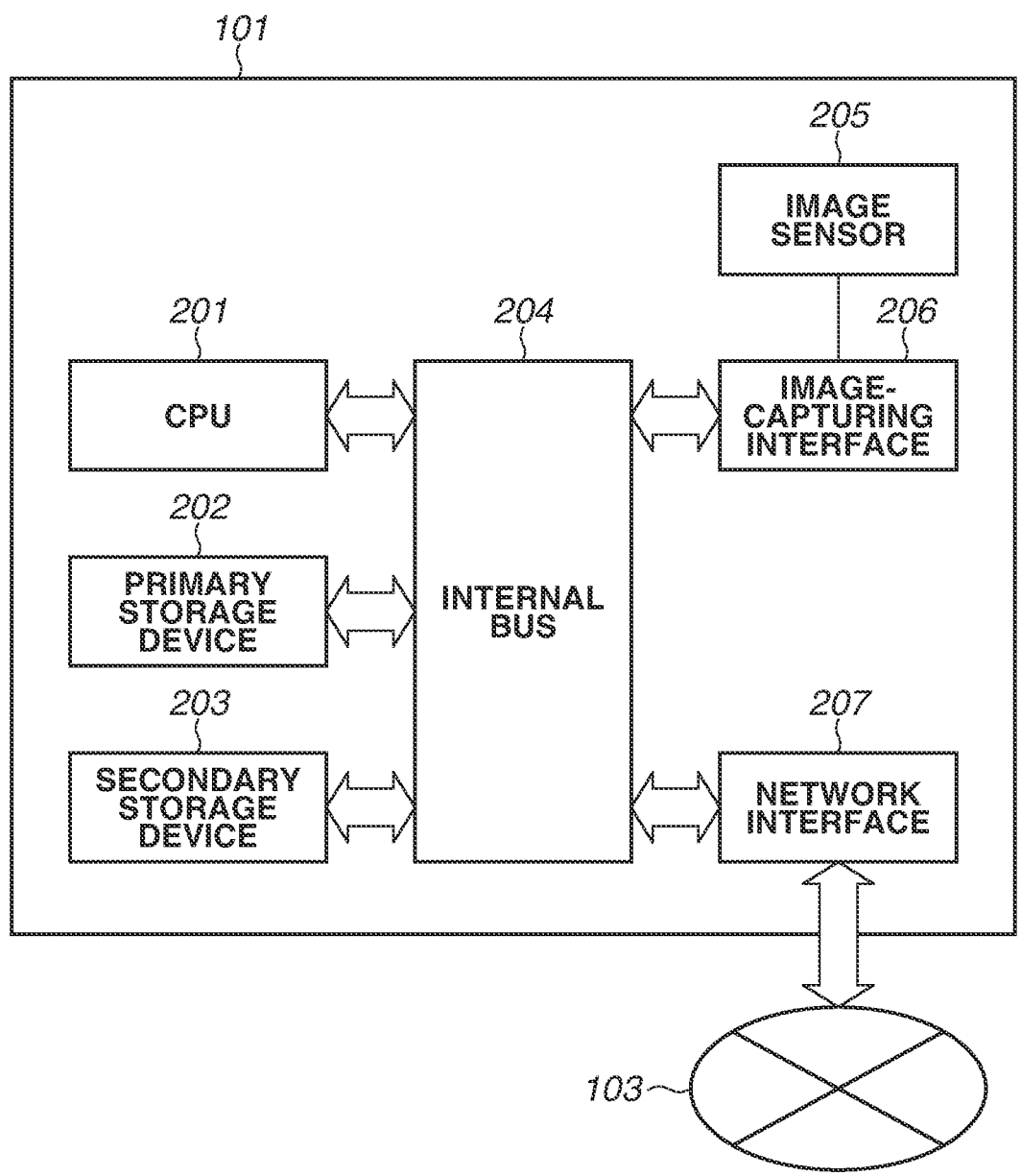
FIG. 2 is a block diagram illustrating a hardware configuration example of an imaging apparatus according to the first exemplary embodiment.

FIG. 2 is a block diagram illustrating a hardware configuration example of the imaging apparatus 101 according to the present exemplary embodiment. In the imaging apparatus 101, a central processing unit (CPU) 201, a primary storage device 202, a secondary storage device 203, an image-capturing interface 206, and a network interface 207 are mutually connected via an internal bus 204. The imaging apparatus 101 includes an image sensor 205. The primary storage device 202 is a writable high-speed storage device such as a random access memory (RAM), on which an operating system (OS), various programs, and various data are loaded. The primary storage device 202 is also used as a work area of the OS or various programs. The secondary storage device 203 is a non-volatile storage device such as a flash memory, a hard disk drive (HDD), or a secure digital (SD) card. The secondary storage device 203 is used as a permanent storage area of the OS, various programs, and various data, or used as a short-term storage area of various data. By the CPU 201 loading a program stored in the secondary storage device 203 to the primary storage device 202, and executing the program, the processing of the imaging apparatus 101 is performed.

The image sensor 205 is a charge coupled device (CCD) sensor or a complementary metal-oxide semiconductor (CMOS) sensor for generating moving image data through photoelectric conversion. The image-capturing interface 206 is connected to the image sensor 205 and converts the moving image data acquired from the image sensor 205 into a predetermined format. Then, the image-capturing interface 206 compresses and transfers the converted moving image data to the primary storage device 202 as a moving image frame. The network interface 207 is connected to the client 102 via the network 103 and responsible for communication with the client 102 that requests an image from the imaging apparatus 101.

Figure 3:
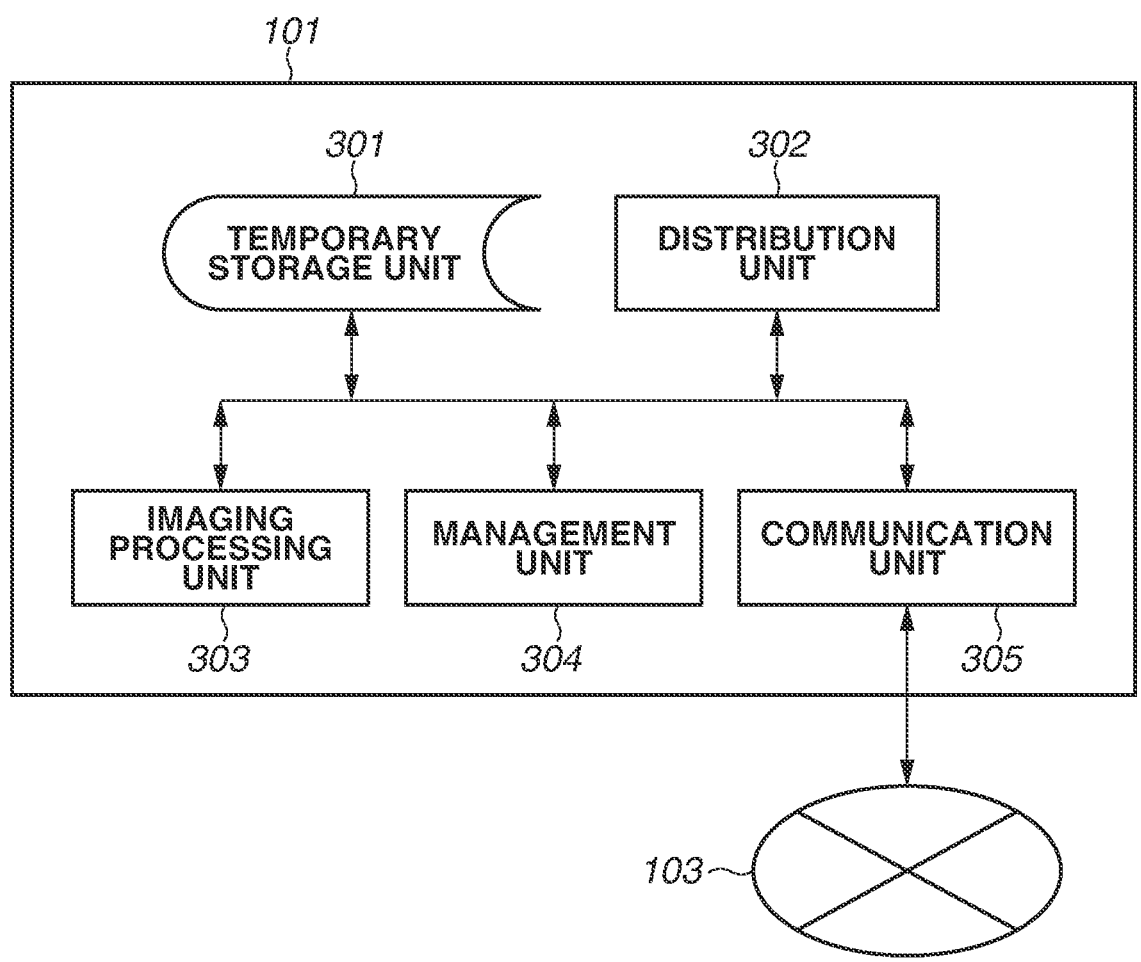
FIG. 3 is a block diagram illustrating a functional configuration example of the imaging apparatus according to the first exemplary embodiment.

FIG. 3 is a block diagram illustrating a functional configuration example of the imaging apparatus 101 according to the present exemplary embodiment. The imaging apparatus 101 includes a temporary storage unit 301, a distribution unit 302, an imaging processing unit 303, a management unit 304, and a communication unit 305. The temporary storage unit 301 corresponds to the primary storage device 202 in FIG. 2. The CPU 201 in FIG. 2 executes a program to cause the distribution unit 302, the imaging processing unit 303, the management unit 304, and the communication unit 305 to function as respective processing units.

The imaging processing unit 303 acquires a moving image frame generated by the image sensor 205 via the image-capturing interface 206. Then, the imaging processing unit 303 encodes the moving image frame and saves the moving image frame in the temporary storage unit 301 together with moving image meta-information such as a sequence parameter set (SPS) or a picture parameter set (PPS) necessary for reproducing the moving image. For example, H.264/Advanced Visual Communication (AVC) or H.265/High Efficiency Video Coding (HEVC) can be used as a coding method. However, the coding method is not limited thereto. Further, the imaging processing unit 303 may select a coding method from a plurality of coding methods to execute encoding. The temporary storage unit 301 temporarily stores the generated moving image meta-information and the moving image frame.

The management unit 304 generates initialization segment information and segment information respectively from the moving image meta-information and the moving image frame that are saved by the imaging processing unit 303 in the temporary storage unit 301, and notifies the distribution unit 302 of the initialization segment information and the segment information. The initialization segment information is information used for generating an initialization segment from the moving image meta-information saved in the temporary storage unit 301. For example, the initialization segment information may be a path of the moving image meta-information saved as a file. The segment information is information for generating a segment from the moving image frame saved in the temporary storage unit 301. For example, text in which paths of data files of moving image frames included in the segment is described in an order from a smallest moving image number may be used. The moving image frames included in each segment are determined based on a number of moving image frames (i.e., a number of segment frames) included in the segment, and the number of segment frames is specified when a start request of a moving image stream is output from the distribution unit 302. A specification method thereof will be described specifically when segment time information 414 in FIG. 4 is described. The management unit 304 retains the moving image frame in the temporary storage unit 301 until the distribution unit 302 releases the segment information.

The distribution unit 302 distributes a playlist in which information about all of distributable moving image streams is described, and an initialization segment and a segment generated by the management unit 304 to the client 102 via the communication unit 305 in response to a request from the client 102. As an example of the playlist, an MPD file defined by the International Organization for Standardization/International Electro-Technical Communication (ISO/IEC) 23009-1:2014 is used. The distribution unit 302 generates a header portion of each of the initialization segment and the segment, and combines the header portion with moving image meta-information and a data portion of a moving image frame described in the initialization segment information and the segment information generated by the management unit 304 to generate an initialization segment and a segment. Then, the distribution unit 302 distributes the initialization segment and the segment to the client 102 via the communication unit 305.

Although an exemplary embodiment in which the management unit 304 distributes the segment after receiving a distribution request from the client 102 has been described, it is not limited thereto. The management unit 304 may generate moving image frames without receiving a request and sequentially distribute a segment through a Hypertext Transfer Protocol version 2 (HTTP/2) or a Websocket protocol at the time when the segment is completed.

FIG. 4 is a diagram illustrating a structure example of the MPD file 400 distributed to the client 102 from the imaging apparatus 101. The MPD file 400 is described in the Extensible Markup Language (XML) format, and schema information 401 includes a namespace specified by an xmlns attribute and a schema document specified by an xsi attribute to define a description method of the MPD file 400.

Profile information 402 specifies a profile "urn:mpeg:dash:profile:isoff-live:2011" defined by the ISO/IEC 23009-1:2014. This profile is designed for DASH live distribution. With this profile, the MPD file 400 can be updated during distribution of the moving image according to a change request of stream setting output to the imaging apparatus 101 from the client 102, an operation status of the imaging apparatus 101 such as a band used rate of the primary storage device 202, or a communication band of the network 103.

For example, the imaging processing unit 303 of the imaging apparatus 101 outputs moving image frames of three distributable moving image streams 1, 2, and 3. In the MPD file 400, information about a moving image distributed through the moving image streams 1, 2, and 3 are defined by data structures Representation 405, 406, and 407. The MPD file 400 is a playlist in which information relating to a plurality of moving image streams can be described.

The Representation 405 includes coding information 409, resolution information 410, frame rate information 411, and distribution bit rate information 412. The coding information 409 describes H.264/AVC and a main profile level as 3.1 as a coding method of the moving image. Resolution information 410 describes a width and a height (480 and 270, respectively) of the moving image. The frame rate information 411 describes a number of moving image frames (30) displayed per second. The distribution bit rate information 412 describes a value of a distribution bit rate of the moving image (680000 bps). Further, the Representation 405 further includes segment time information 414 that describes a time unit at which the segment is divided (i.e., segment time) as follows.

(Segment Time of Representation 405)=(Duration of Segment Time Information 414)/(Timescale of Segment Time Information 414)=300/3000 sec.=0.1 sec.

Therefore, the above-described number of segment frames output from the distribution unit 302 to the management unit 304 can be derived and specified by the following formula.

(Number of Segment Frames of Representation 405)=(Frame Rate of Representation 405)=0.1 sec.×30 (1/sec)×(Segment Time of Representation 405)=3

The Representation 405 further includes initialization segment uniform resource identifier (URI) information 416 and segment URI information 415 of the moving image stream 1. The client 102 uses MPDBaseURI information 403 including an IP address of the imaging apparatus 101 and RepresentationBaseURI information 413 including an identifier of the moving image stream 1 to access the following URI. Then, the client 102 acquires an initialization segment and a segment of the moving image stream 1.

(Initialization Segment URI of Representation 405)= (MPDBaseURI Information 403)+(RepresentationBaseURI Information 413)+(Initialization Segment URI Information 416)="http://192.169.100.1:80/video/stream1/init1.mp4" (segment URI of Representation 405)=(MPDBaseURI Information 403)+(RepresentationBaseURI Information 413)+(Segment URI Information 415)="http://192.169.100.1:80/video/stream1/media1_$Number$.m4s"

In each of the above formulas, "A+B" represents connecting a character string of the element B onto the right side of the character string of the element A. "$Number$" is a template expression, and an evaluation value is incremented from a value of "startNumber" described in the segment URI information 415 for each segment.

An actual URI of each of the segments of the moving image stream 1 is "http://192.169.100.1:80/video/stream1/media1_1.m4s", "http://192.169.100.1:80/video/stream1/media1_2.m4s", or "http://192.169.100.1:80/video/stream1/media1_3.m4s".

In addition, as a template expression of the URI, $RepresentationID$ may be used as the Representation ID 408 of the Representation 405. Further, $BandWidth$ may be used for a value of the distribution bit rate 412 of the Representation 405. Furthermore, a combination of these expressions can also be used.

The Representation 406 includes coding information 418, resolution information 419, frame rate information 420, distribution bit rate information 421, and segment time information 423. The Representation 406 further includes a Representation ID 417, initialization segment URI information 425, and segment URI information 424.

The Representation 407 includes coding information 427, resolution information 428, frame rate information 429, distribution bit rate information 430, and segment time information 432. The Representation 407 further includes a Representation ID 426, initialization segment URI information 434, and segment URI information 433.

As with the case of the Representation 405 that expresses the information about the moving image stream 1, the Representation 406 and 407 express various values with respect to the moving image streams 2 and 3. For the sake of simplicity, although three moving image streams are defined in the present exemplary embodiment, the number of moving image streams to be defined does not have to be three, and only one moving image stream may be defined according to a request of the client 102.

FIG. 5 is a block diagram illustrating a relationship between the moving image stream 1 and respective segments of the moving image stream 1. When the imaging processing unit 303 receives a start request of the moving image stream 1, the imaging processing unit 303 consecutively generates moving image meta-information 501 including the SPS and the PPS and moving image frames 511 to 516, and, at the same time, outputs a generation notification to the management unit 304. Each of the moving image frames 511 and 514 represents an I-frame, which includes moving image information necessary for constituting a complete moving image frame, and the other moving image frames represent P-frames, which include moving image information about a difference with an immediately preceding image. The I-frame is a moving image frame encoded through intraframe coding, whereas the P-frame is a moving image frame encoded through interframe coding. The imaging processing unit 303 encodes a captured moving image frame through the intraframe coding or the interframe coding. The imaging processing unit 303 continuously generates moving image frames after generating the moving image frame 516 and outputs a generation notification to the management unit 304 at the same time each of the moving image frame segments is generated.

The management unit 304 first generates an initialization segment 500 including moving image meta-information 501, subsequently generates a segment 1-1 520 including moving image frames 511, 512, and 513, and further generates a segment 1-2 530 including moving image frames 514, 515, and 516. The management unit 304 serves as a generation unit, and continuously generates segments with respect to the moving image frames generated by the imaging processing unit 303 after generating the segment 1-2 530.

Similarly, as to the other moving image streams, the management unit 304 also divides each of the moving image frames generated by the imaging processing unit 303 into segments according to the specified number of segment frames. In the present exemplary embodiment, although a P-frame is the moving image information about a difference, a B-frame may be the moving image information about a difference. Further, the first moving image frame included in the segment does not have to be the I-frame.

Figure 6:
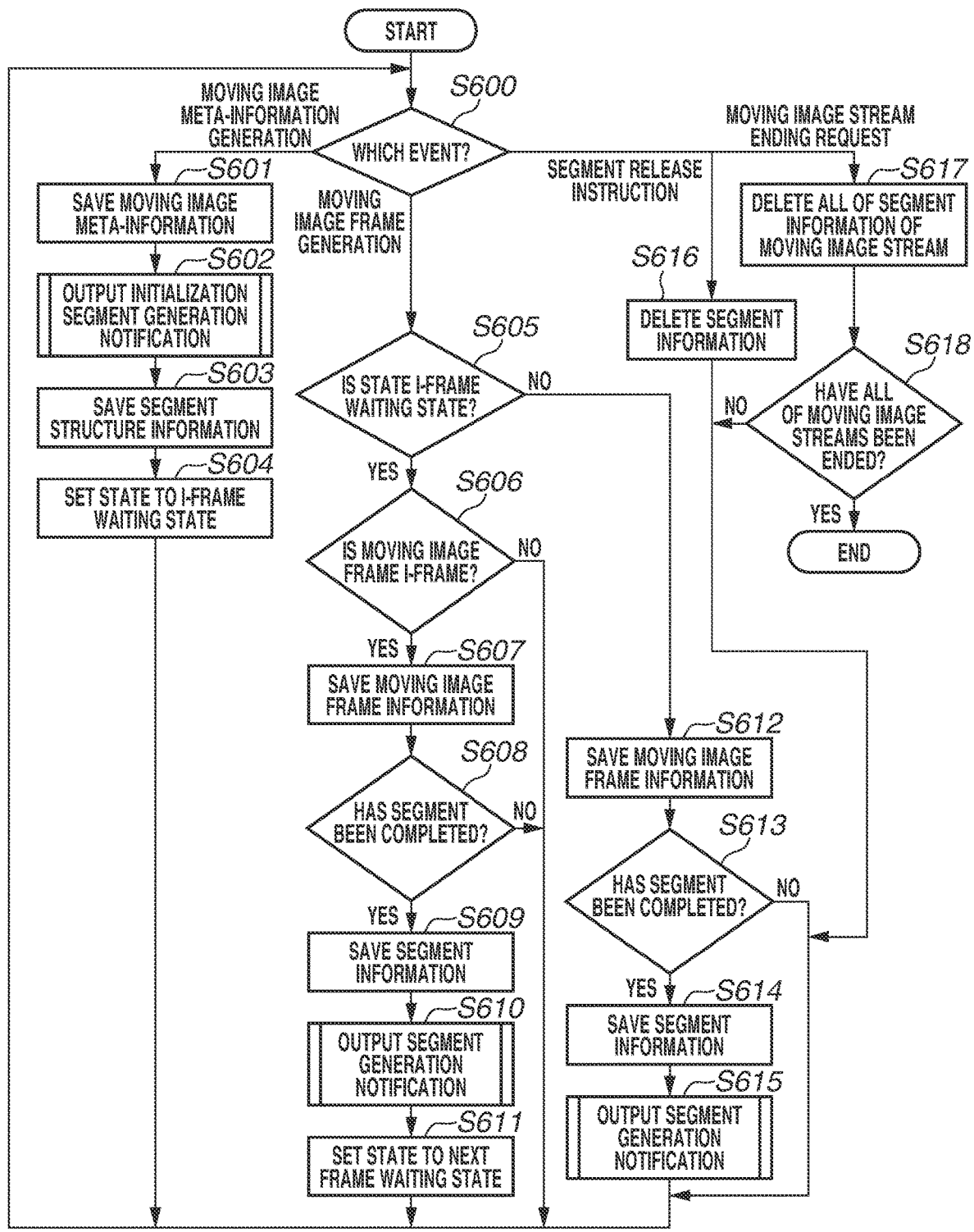
FIG. 6 is a flowchart illustrating processing performed by a management unit.

FIG. 6 is a flowchart illustrating a processing example of the management unit 304. The management unit 304 is activated by the imaging processing unit 303 outputting a start request immediately after the imaging processing unit 303 is activated. In step S600, the management unit 304 waits for occurrence of an event, and switches a processing operation according to the determination of the occurring event. If the management unit 304 determines that the occurring event is a moving image meta-information generation event output from the imaging processing unit 303 ("MOVING IMAGE META-INFORMATION GENERATION EVENT" in step S600), the processing proceeds to step S601. If the management unit 304 determines that the occurring event is a moving image frame generation event output from the imaging processing unit 303 ("MOVING IMAGE FRAME GENERATION EVENT" in step S600), the processing proceeds to step S605. If the management unit 304 determines that the occurring event is a segment release instruction event output from the distribution unit 302 ("SEGMENT RELEASE INSTRUCTION EVENT" in step S600), the processing proceeds to step S616. If the management unit 304 determines that the occurring event is a moving image stream ending request event output from the distribution unit 302 ("MOVING IMAGE STREAM ENDING REQUEST EVENT" in step S600), the processing proceeds to step S617.

In step S601, the management unit 304 saves the moving image meta-information. In step S602, the management unit 304 generates an initialization segment including the moving image meta-information and outputs a generation notification to the distribution unit 302. In step S603, the management unit 304 saves segment structure information such as a number of segment frames specified when a start request of the moving image stream is received. In step S604, the management unit 304 sets the own state to an I-frame waiting state. Then, the processing returns to step S600.

In step S605, the management unit 304 determines the own state. Then, if the management unit 304 determines that the own state is the I-frame waiting state (YES in step S605), the processing proceeds to step S606. If the management unit 304 determines that the own state is a next frame waiting state (NO in step S605), the processing proceeds to step S612.

In step S606, the management unit 304 determines whether the generated moving image frame is the I-frame. If the management unit 304 determines that the moving image frame is the I-frame (YES in step S606), the processing proceeds to step S607. If the management unit 304 determines that the moving image frame is not the I-frame (NO in step S606), the processing returns to step S600.

In step S607, the management unit 304 saves the moving image frame information. In step S608, the management unit 304 determines whether the moving image frames of a number equivalent to the number of segment frames included in the segment structure information saved in step S603 have been generated. Then, if the management unit 304 determines that the moving image frames of a number equivalent to the number of segment frames have been generated (YES in step S608), the processing proceeds to step S609. If the management unit 304 determines that the moving image frames of a number equivalent to the number of segment frames have not been generated (NO in step S608), the processing returns to step S600.

In step S609, the management unit 304 saves a segment number and the moving image frame information included in the segment. In step S610, the management unit 304 notifies the distribution unit 302 that the segment has been generated. In step S611, the management unit 304 sets the own state to the next frame waiting state. Then, the processing returns to step S600.

In steps S609 and S610 described above, it is important that the management unit 304 should save only the segment information and the moving image frame information and output the notification. If the management unit 304 generates the segment from a moving image data portion of the moving image frame, the temporary storage unit 301 may be insufficient because it is necessary to save the segment for each client 102 in addition to executing copy processing of data.

In step S612, the management unit 304 saves the moving image frame information. In step S613, the management unit 304 determines whether the moving image frames of a number equivalent to the number of segment frames included in the segment structure information saved in step S603 have been generated. Then, if the management unit 304 determines that the moving image frames of a number equivalent to the number of segment frames have been generated (YES in step S613), the processing proceeds to step S614. If the management unit 304 determines that the moving image frames of a number equivalent to the number of segment frames have not been generated (NO in step S613), the processing returns to step S600.

In step S614, the management unit 304 saves the segment number and the moving image frame information included in the segment. In step S615, the management unit 304 notifies the distribution unit 302 that the segment has been generated. Then, the processing returns to step S600.

The present exemplary embodiment has been described based on the assumption that the moving image frames are always generated consecutively. However, if there is a possibility that the moving image frames are not generated consecutively, the management unit 304 may determine whether the moving image frames are generated consecutively, and may execute processing of returning the state to the I-frame waiting state again if the moving image streams are not generated consecutively.

In step S616, the management unit 304 deletes the saved segment information and the moving image frames included in that segment. Then, the processing returns to step S600.

In step S617, the management unit 304 deletes all of the saved segment information and the moving image frames included in that segment. In step S618, the management unit 304 determines whether all of the moving image streams have been ended. If the management unit 304 determines that all of the moving image streams have been ended (YES in step S618), the processing is ended. If the management unit 304 determines that not all of the moving image streams have been ended (NO in step S618), the processing returns to step S600.

In the present exemplary embodiment, when the distribution unit 302 outputs a start request of the moving image stream, the management unit 304 is activated at the same time the imaging processing unit 303 is activated. However, the management unit 304 may be activated constantly, so that the segment information of all of the clients 102 is managed by the single management unit 304.

Figure 7:
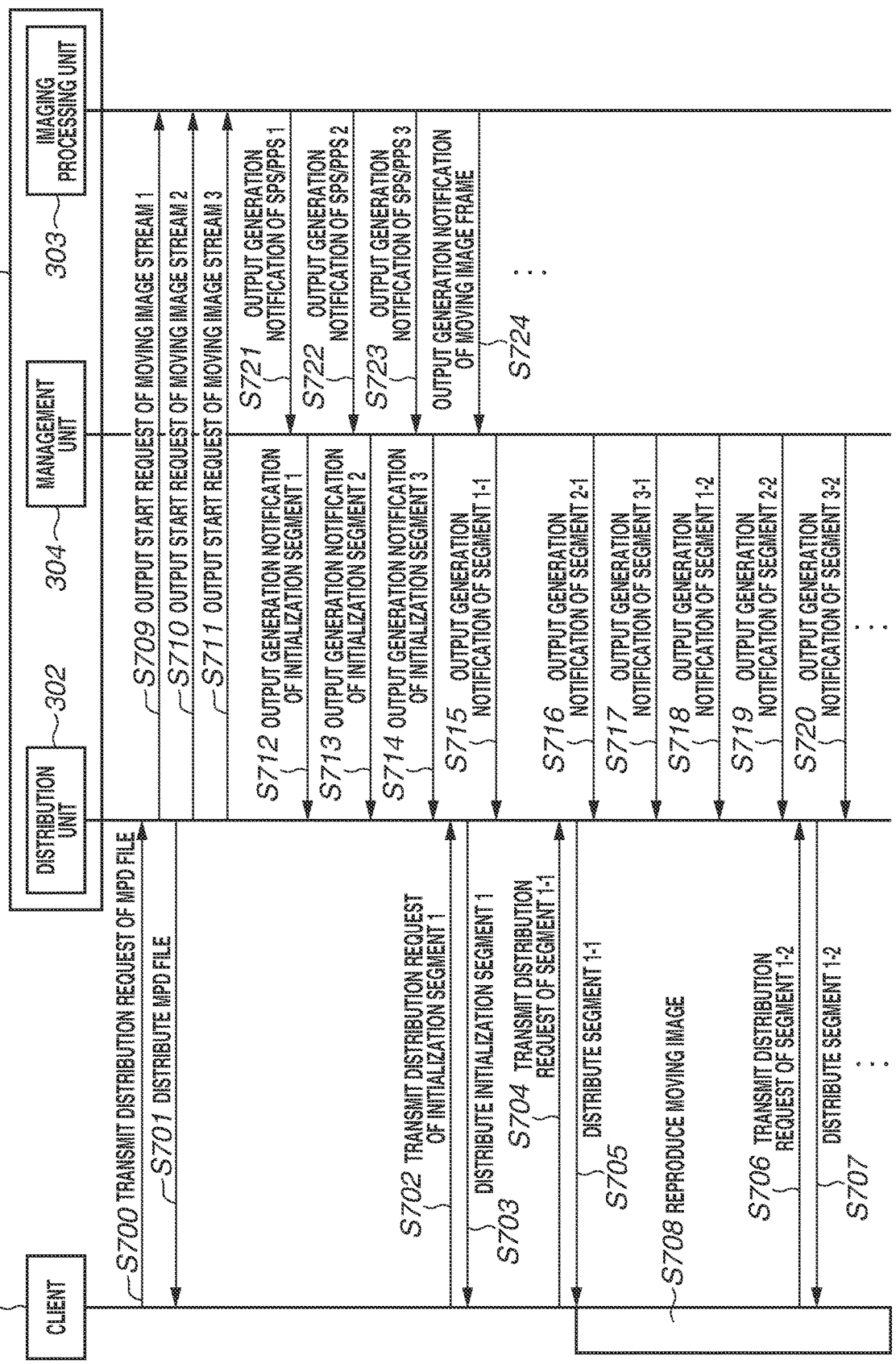
FIG. 7 is a sequence diagram illustrating an example of a mutual interaction between the imaging apparatus and a client.

FIG. 7 is a sequence diagram illustrating processing when the client 102 receives a moving image distributed from the imaging apparatus 101. Hereinafter, a processing method of the client 102 and the imaging apparatus 101 will be described. The imaging apparatus 101 includes the imaging processing unit 303 for executing imaging processing, the management unit 304 for generating and managing a segment based on the moving image meta-information and the moving image frame generated by the imaging processing unit 303, and the distribution unit 302 for executing distribution processing with respect to the client 102.

First, in step S700, the client 102 transmits to the imaging apparatus 101 a distribution request of the MPD file 400 that collectively includes pieces of moving image information. In step S701, when the distribution unit 302 of the imaging apparatus 101 receives the distribution request of the MPD file 400, the distribution unit 302 generates the MPD file 400 that collectively includes distributable moving image streams and distributes the MPD file 400 to the client 102.

In step S709, the distribution unit 302 outputs a stream start request of a moving image stream 1 described in the MPD file 400, to the imaging processing unit 303. Then, in step S710, the distribution unit 302 outputs a stream start request of a moving image stream 2 described in the MPD file 400, to the imaging processing unit 303. Then, in step S711, the distribution unit 302 outputs a stream start request of a moving image stream 3 described in the MPD file 400, to the imaging processing unit 303.

When the imaging processing unit 303 receives the start request of the moving image stream 1 in step S709, in step S721, the imaging processing unit 303 generates moving image meta-information including the SPS and the PPS with respect to the moving image stream 1, and outputs a generation notification to the management unit 304. When the imaging processing unit 303 receives the start request of the moving image stream 2 in step S710, in step S722, the imaging processing unit 303 generates moving image meta-information including the SPS and the PPS with respect to the moving image stream 2, and outputs a generation notification to the management unit 304. When the imaging processing unit 303 receives the start request of the moving image stream 3 in step S711, in step S723, the imaging processing unit 303 generates moving image meta-information including the SPS and the PPS with respect to the moving image stream 3, and outputs a generation notification to the management unit 304. Then, in step S724, the imaging processing unit 303 consecutively generates the moving image frames and outputs a generation notification to the management unit 304.

When the management unit 304 receives the generation notification of the moving image meta-information in step S721, in step S712, the management unit 304 generates an initialization segment 1, and outputs a generation notification to the distribution unit 302 if generation thereof has been completed. When the management unit 304 receives the generation notification of the moving image meta-information in step S722, in step S713, the management unit 304 generates an initialization segment 2, and outputs a generation notification to the distribution unit 302 if generation thereof has been completed. When the management unit 304 receives the generation notification of the moving image meta-information in step S723, in step S714, the management unit 304 generates an initialization segment 3, and outputs a generation notification to the distribution unit 302 if generation thereof has been completed.

Next, in each of steps S715 to S720, the management unit 304 generates a segment based on the segment structure information specified when the start request of the moving image stream is output thereto. More specifically, the management unit 304 generates segments 1-1, 1-2, . . . , and so on, with respect to the moving image stream 1, generates segments 2-1, 2-2, . . . , and so on, with respect to the moving image stream 2, and generates segments 3-1, 3-2, . . . , and so on, with respect to the moving image stream 3. Then, the management unit 304 outputs a generation notification to the distribution unit 302 when generation of each of the segments has been completed.

The client 102 analyzes the MPD file 400 acquired in step S701, and selects a moving image stream to be received based on the CPU capability, the display resolution, and the communication band of its own apparatus. In step S702, the client 102 transmits a distribution request of an initialization segment including information necessary for executing reproduction to the imaging apparatus 101. In FIG. 7, the client 102 selects the moving image stream 1 and transmits a distribution request of the initialization segment 1 to the imaging apparatus 101. In addition, the client 102 may transmit a distribution request of the initialization segment of another moving image stream described in the MPD file 400, or may acquire the initialization segment from the imaging apparatus 101 through a server-push method.

In step S703, the distribution unit 302 distributes the specified initialization segment to the client 102. In FIG. 7, the distribution unit 302 distributes the initialization segment 1 to the client 102.

After receiving the initialization segment 1, in step S704, the client 102 transmits a distribution request of a segment 1-1 to the imaging apparatus 101. In step S705, the distribution unit 302 distributes the segment 1-1 to the client 102 when the segment 1-1 is generated in step S715. In step S708, the client 102 reproduces the moving image after receiving the segment 1-1. If necessary, the client 102 may buffer the segment 1-1 for a certain period before starting reproduction of the moving image.

In step S706, the client 102 transmits a distribution request of a next segment 1-2 to the imaging apparatus 101. In step S707, the distribution unit 302 distributes the segment 1-2 to the client 102 when the segment 1-2 is generated in step S718. After reproducing the moving image frames included in the segment 1-1, the client 102 sequentially reproduces the moving image frames included in the segment 1-2 so as not to interrupt the reproduction of the moving image. Then, the client 102 similarly and sequentially acquires segments from the imaging apparatus 101 and reproduces the moving image.

Figure 8:
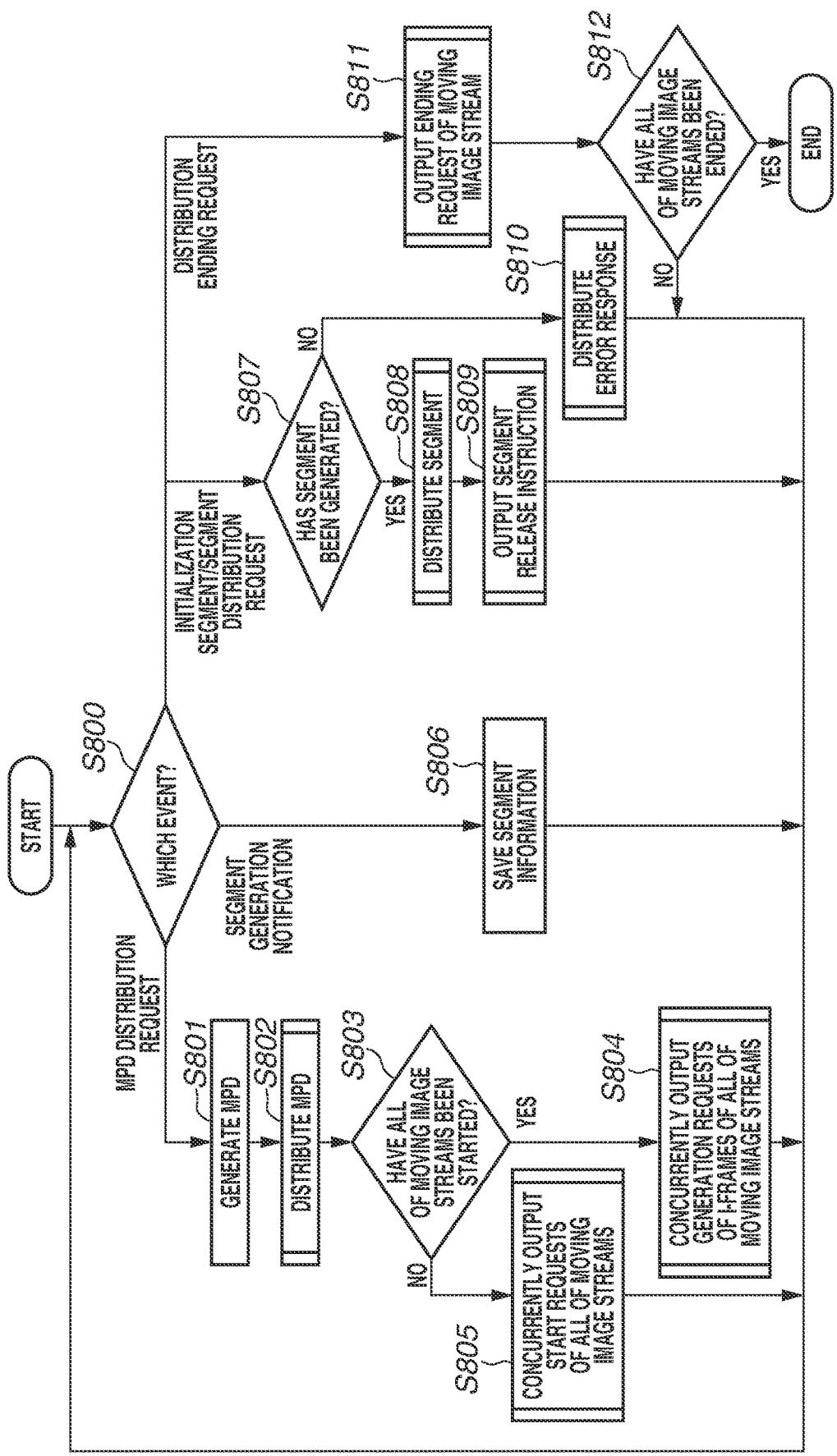
FIG. 8 is a flowchart illustrating processing performed by a distribution unit according to the first exemplary embodiment.

FIG. 8 is a flowchart illustrating a processing example of the distribution unit 302 according to the present exemplary embodiment. In step S800, the distribution unit 302 waits for occurrence of an event and switches a processing operation based on the determination of the occurring event. If the distribution unit 302 determines that the occurring event is an MPD distribution request event transmitted from the client 102 ("MPD DISTRIBUTION REQUEST EVENT" in step S800), the processing proceeds to step S801. If the distribution unit 302 determines that the occurring event is a segment generation notification event output from the management unit 304 ("SEGMENT GENERATION NOTIFICATION EVENT" in step S800), the processing proceeds to step S806. If the distribution unit 302 determines that the occurring event is a distribution request of an initialization segment or a segment transmitted from the client 102 ("INITIALIZATION SEGMENT/SEGMENT DISTRIBUTION REQUEST EVENT" in step S800), the processing proceeds to step S807. If the distribution unit 302 determines that the occurring event is a distribution ending request event of a moving image stream ("DISTRIBUTION ENDING REQUEST EVENT" in step S800), the processing proceeds to step S811.

In step S801, the distribution unit 302 generates the MPD file 400 collectively including information about one or a plurality of currently-distributable moving image streams. In step S802, the distribution unit 302 distributes the MPD file 400 to the client 102. In step S803, the distribution unit 302 determines whether all of the moving image streams described in the MPD file 400 have been started. Then, if the distribution unit 302 determines that all of the moving image streams have already been started (YES in step S803), the processing proceeds to step S804. If the distribution unit 302 determines that not all of the moving image streams have been started (NO in step S803), the processing proceeds to step S805.

In step S804, the distribution unit 302 outputs generation requests of I-frames of all of the moving image streams to the imaging processing unit 303, and the processing returns to step S800. In step S805, the distribution unit 302 concurrently outputs start requests of all of the moving image streams described in the MPD file 400 to the imaging processing unit 303, and the processing returns to step S800.

Here, although the distribution unit 302 concurrently outputs the start requests of all of the moving image streams in step S805, as illustrated in FIG. 5, the I-frame is generated as a first frame to be generated after start of the moving image stream. The start request of the moving image stream and the generation request of the I-frame may be executed sequentially instead of being executed concurrently with respect to all of the moving image streams. The distribution unit 302 concurrently or sequentially outputs generation requests of the moving image frames of all of the moving image streams included in the MPD file 400 (i.e., playlist) encoded through the intraframe coding to the imaging processing unit 303.

For example, in step S803, all of the moving image streams have already been started (YES in step S803) in a case where the client 102 has already completed the processing in the first steps S801 to S803 and S805. Other than the above case, all of the moving image streams have already been started if a client other than the client 102 has connected to the imaging apparatus 101 and the processing in steps S801 to S803 and S805 is completed.

In step S806, the distribution unit 302 saves the segment information including the moving image frames. Then, the processing returns to step S800.

In step S807, the distribution unit 302 determines whether the requested initialization segment or the requested segment has already been generated. Then, if the distribution unit 302 determines that the initialization segment or the segment has already been generated (YES in step S807), the processing proceeds to step S808. If the distribution unit 302 determines that the initialization segment or the segment has not been generated (NO in step S807), the processing proceeds to step S810.

In step S808, the distribution unit 302 generates a header portion of the segment and distributes the segment together with the header portion attached to a data portion of the moving image frame to the client 102 via the communication unit 305. In step S809, the distribution unit 302 instructs the management unit 304 to release the distributed segment. Then, the processing returns to step S800. In order not to increase a copy processing load and a memory used amount, in step S808, it is important that the distribution unit 302 generates only a header portion and distributes a segment while attaching the header portion to a data portion of a moving image frame.

In step S810, the distribution unit 302 distributes an error response to the client 102. Then, the processing returns to step S800. In the above, although the distribution unit 302 distributes the error response if a requested segment does not exist, the distribution unit 302 may wait until the segment is generated.

In step S811, the distribution unit 302 outputs an ending request of the moving image stream to the management unit 304 to stop generation of segments of the moving image stream. In step S812, the distribution unit 302 determines whether all of the moving image streams have been ended. If the distribution unit 302 determines that all of the moving image streams have been ended (YES in step S812), the processing is ended. If the management unit 304 determines that not all of the moving image streams have been ended (NO in step S812), the processing returns to step S800. In addition, although the processing is ended when the distribution unit 302 determines that all of the moving image streams have been ended in step S812, event determination in step S800 may be executed continuously until the ending request is received from another processing unit of the imaging apparatus 101.

As described above, when the distribution request of the MPD file 400 is received in step S700, the imaging processing unit 303 encodes the moving image streams included in the MPD file 400 in step S724 before a distribution request of a specific moving image stream is received in step S702. More specifically, the imaging processing unit 303 serves as a coding unit and encodes a moving image frame corresponding to a moving image stream described in the MPD file 400 through intraframe coding. When the distribution unit 302 receives a distribution request of a specific moving image stream (i.e., an initialization segment or a segment), the distribution unit 302 distributes a moving image stream corresponding to the specific moving image stream including a moving image frame encoded through intraframe coding.

As described above, the imaging apparatus 101 starts generation of all of the moving image streams when the distribution request of the MPD file 400 is received, so that the initialization segment or the segment can be transmitted instantly even if the client 102 selects any moving image stream. With this processing, the imaging apparatus 101 can distribute a moving image to the client 102 with a short delay time.

Figure 9:
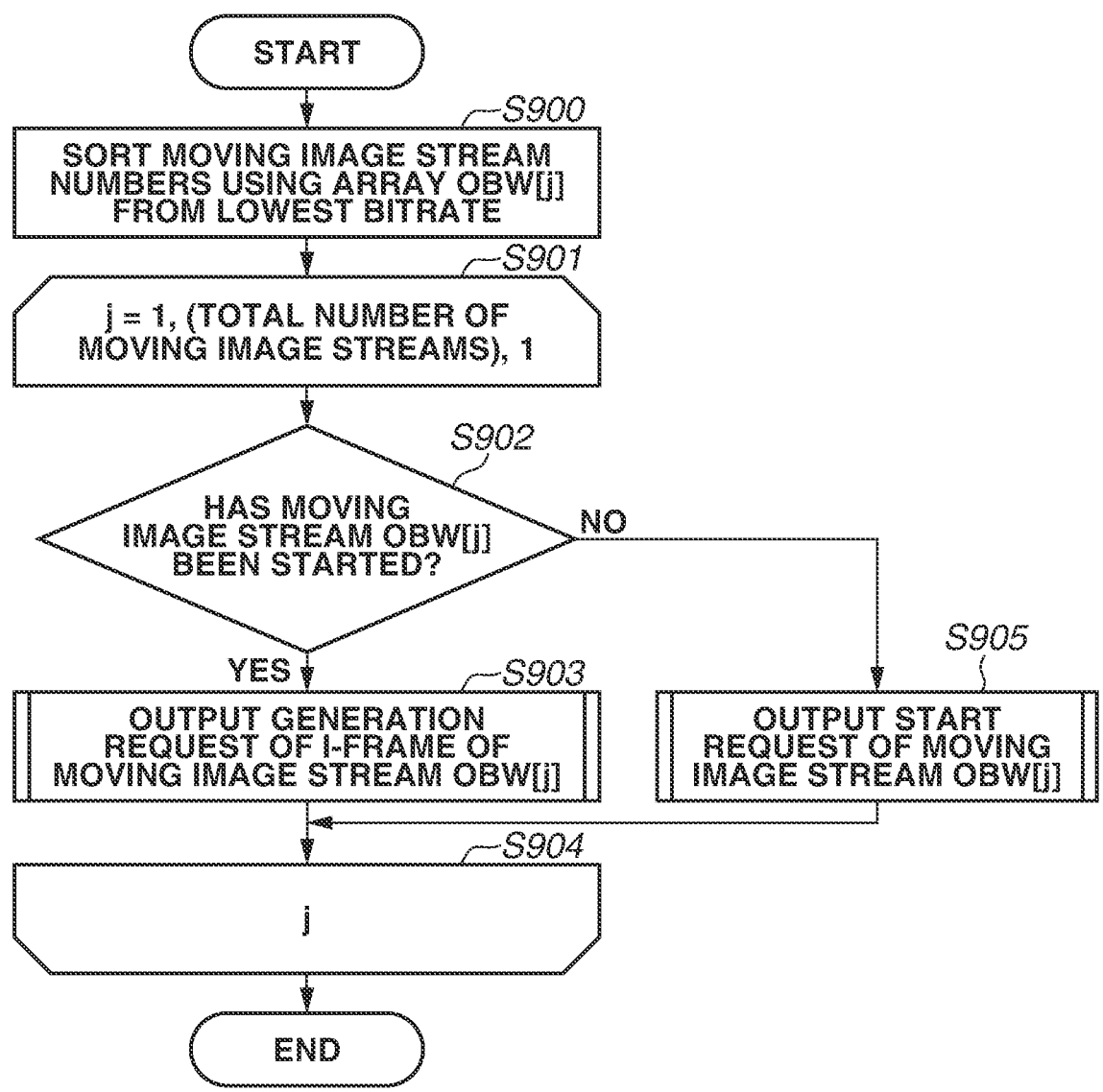
FIG. 9 is a flowchart illustrating processing performed by a distribution unit of a second exemplary embodiment.

FIG. 9 is a flowchart illustrating a part of a processing example of the distribution unit 302 according to a second exemplary embodiment of the present disclosure. In the present exemplary embodiment, the distribution unit 302 executes the processing in steps S900 to S905 in place of the processing in steps S803 to S805 executed by the distribution unit 302 in the first exemplary embodiment. Descriptions of portions common to the first and the present exemplary embodiments are omitted, and portions different in the first and the present exemplary embodiments will be described.

FIG. 9 is a flowchart illustrating processing executed by the distribution unit 302, in which a start request of a moving image stream is executed in an order from a lowest distribution bit rate. In step S900, the distribution unit 302 refers to distribution bit rates 412, 421, and 430 of the moving image streams 1, 2, and 3 described in the MPD file 400, and sorts the ids (identification numbers) of the moving image streams 1 to 3 in an order from the lowest distribution bit rate, using an array OBW[j]. In addition, any sorting algorithm such as bubble sorting or binary tree sorting may be used as the sorting method. Bit rates of the moving image streams 1, 2, and 3 and a sorting example of the array OBW[j] are illustrated as follows.
(Distribution Bit Rate 680000 [bps] of Moving Image Stream 1)<(Distribution Bit Rate 1360000 [bps] of Moving Image Stream 2)<(Distribution Bit Rate 5680000 [bps] of Moving Image Stream 3)
OBW[1]=1
OBW[2]=2
OBW[3]=3

In step S901, the distribution unit 302 executes loop processing of a total number of moving image streams described in the MPD file 400 with respect to a variable j starting from a value 1. When processing with respect to all of the moving image streams has been completed, the distribution unit 302 ends the loop processing of the total number of moving image streams.

In step S902, the distribution unit 302 determines whether a moving image stream of the array OBW[j] of the moving image streams described in the MPD file 400 has already been started. If the distribution unit 302 determines that the moving image stream of the array OBW[j] has already been started (YES in step S902), the processing proceeds to step S903. If the distribution unit 302 determines that the moving image stream of the array OBW[j] has not been started (NO in step S902), the processing proceeds to step S905.

In step S903, the distribution unit 302 outputs a generation request of the I-frame of the moving image stream of the array OBW[j] to the imaging processing unit 303. Then, the processing proceeds to step S904.

In step S905, the distribution unit 302 outputs a start request of the moving image stream of the array OBW[j] to the imaging processing unit 303. Then, the processing proceeds to step S904. At that time, the distribution unit 302 outputs the start request of the moving image stream in step S905, and, as illustrated in FIG. 5, the I-frame is generated as a first frame to be generated after start of the moving image stream.

In step S904, if the variable j is not equal to the total number of moving image streams, the distribution unit 302 increments the variable j, and the processing returns to step S901. If the variable j is equal to the total number of moving image streams, the processing returns to step S800 in FIG. 8.

As described above, the distribution unit 302 outputs generation requests of moving image frames of all of the moving image streams described in the MPD file 400 encoded through intraframe coding to the imaging processing unit 303 in an order from the lowest distribution bit rate.

The imaging apparatus 101 outputs the start requests of the moving image streams in an order from the lowest distribution bit rate when the distribution request of the MPD file 400 is received. With this configuration, it is expected that a starting preparation of the moving image stream from data having a small processing data size per unit time is completed while the imaging apparatus 101 distributes the moving image to the client 102 with a short delay time. Therefore, a memory used amount per unit time of the imaging apparatus 101 can be reduced.

Figure 10:
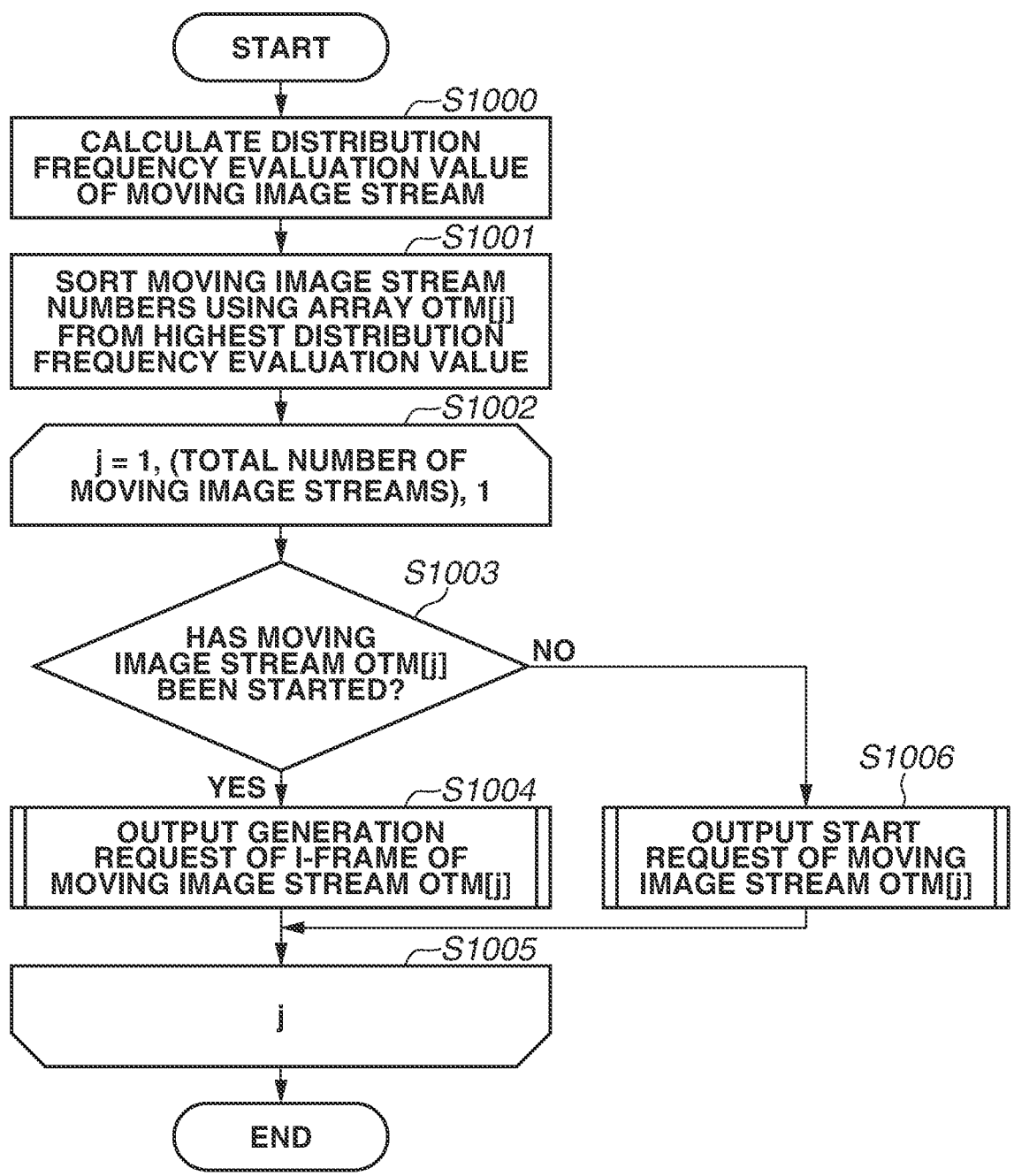
FIG. 10 is a flowchart illustrating processing performed by a distribution unit according to a third exemplary embodiment.

FIG. 10 is a flowchart illustrating a part of a processing example of the distribution unit 302 according to a third exemplary embodiment of the present disclosure. In the present exemplary embodiment, the distribution unit 302 executes the processing in steps S1000 to S1006 in place of the processing in steps S803 to S805 executed by the distribution unit 302 in the first exemplary embodiment. Descriptions of portions common to the first and the present exemplary embodiments are omitted, and portions different in the first and the present exemplary embodiments will be described.

FIG. 10 is a flowchart illustrating processing executed by the distribution unit 302, in which a start request of a moving image stream is output in an order from a highest distribution frequency. In step S1000, the distribution unit 302 reads out distribution history information (described below) of each of the moving image streams 1, 2, and 3 saved in the temporary storage unit 301, calculates a distribution frequency evaluation value val(i) of each moving image stream "i", and stores the distribution frequency evaluation value val(i) in the temporary storage unit 301. A calculation formula of a total distribution time of the moving image stream i from a time $T_m$ to a time $T_M$ is expressed as a formula 1 as an example of the distribution frequency evaluation value val(i) of the moving image stream i.

$$val(i) = \sum_{s \in S} (T_c(s) - T_o(s)) \quad \text{Formula 1}$$

$$\text{s.t.} \quad S = \{s \mid strm(s) = i, T_m \le T_o(s), T_c(s) \le T_M\}$$

In the formula 1, a symbol "s" represents a structure including distribution meta-information of a series of moving image stream distribution. A symbol "strm(s)" represents a moving image stream id of a series of moving image stream distribution. A symbol "To(s)" represents a distribution start time of a series of moving image stream distribution. A symbol "Tc(s)" represents a distribution ending time of a series of moving image stream distribution. Here, although the distribution frequency evaluation value val(i) of the moving image stream i is defined by the formula 1, another definition using a number of times of access from the client 102 to the moving image stream i may be also used.

In step S1001, the distribution unit 302 refers to the distribution frequency evaluation value val(i) of each of the moving image streams 1, 2, and 3 described in the MPD file 400 from the temporary storage unit 301. Then, the distribution unit 302 sorts the ids of the moving image streams using an array OTM[j] in an order from the highest distribution frequency evaluation value val(i). In addition, any sorting algorithm such as bubble sorting or binary tree sorting may be used as the sorting method.

In step S1002, the distribution unit 302 executes loop processing of a total number of moving image streams in the MPD file 400 with respect to a variable j starting from a value 1. When the processing with respect to all of the moving image streams have been completed, the distribution unit 302 ends the loop processing of the total number of moving image streams.

In step S1003, the distribution unit 302 determines whether a moving image stream of the array OTM[j] described in the MPD file 400 has already been started. If the distribution unit 302 determines that the moving image stream of the array OTM[j] has already been started (YES in step S1003), the processing proceeds to step S1004. If the distribution unit 302 determines that the moving image stream of the array OTM[j] has not been started (NO in step S1003), the processing proceeds to step S1006.

In step S1004, the distribution unit 302 outputs a generation request of the I-frame of the moving image stream of the array OTM[j] to the imaging processing unit 303. Then, the processing proceeds to step S1005.

In step S1006, the distribution unit 302 outputs a start request of the moving image stream of the array OTM[j] to the imaging processing unit 303. Then, the processing proceeds to step S1005. At that time, the distribution unit 302 outputs the start request of the moving image stream in step S1006, and, as illustrated in FIG. 5, the I-frame is generated as a first frame to be generated after start of the moving image stream.

In step S1005, if the variable j is not equal to the total number of moving image streams, the distribution unit 302 increments the variable j, and the processing returns to step S1002. If the variable j is equal to the total number of moving image streams, the processing returns to step S800.

Figure 11:
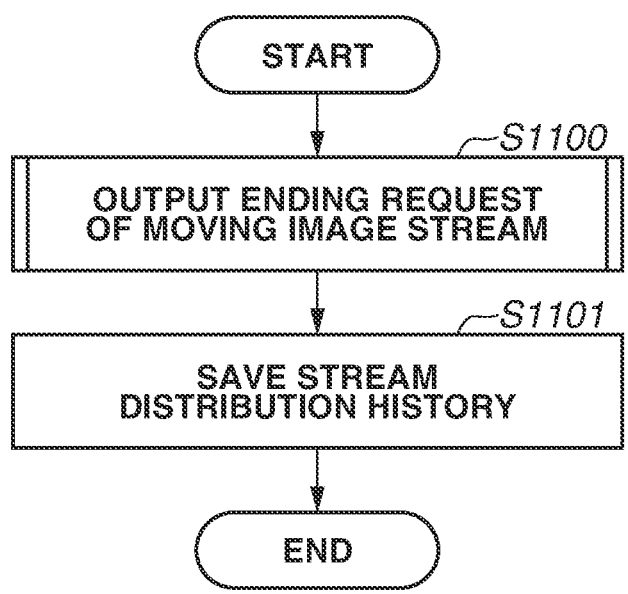
FIG. 11 is a flowchart illustrating processing performed by a distribution unit according to the third exemplary embodiment.

FIG. 11 is a flowchart illustrating another part of the processing example of the distribution unit 302 according to the third exemplary embodiment of the present disclosure. In the present exemplary embodiment, the distribution unit 302 executes the processing in steps S1100 and S1101 in place of the processing in step S811 executed by the distribution unit 302 in the first exemplary embodiment.

FIG. 11 is a flowchart illustrating processing by the distribution unit 302 for ending a moving image stream and saving a stream distribution history information. In step S1100, the distribution unit 302 outputs to the management unit 304 an ending request of the moving image stream for which a distribution ending request is received from the client 102, and stops generation of segments of the moving image stream. In step S1101, the distribution unit 302 saves the distribution history information of the moving image stream ended in step S1100 in the temporary storage unit 301. For example, as the distribution history information of the moving image stream, a distribution starting time and a distribution ending time of the moving image stream may be saved for a series of moving image stream distribution.

As described above, the distribution unit 302 outputs generation requests of moving image frames of all of the moving image streams described in the MPD file 400 encoded through the intraframe coding to the imaging processing unit 303 in an order from the highest distribution frequency.

As described above, when the distribution request of the MPD file 400 is received, the imaging apparatus 101 outputs a start request of the moving image stream in an order from the highest distribution frequency, so that a moving image can be distributed to the client 102 with a short delay time. Further, there is a case where the imaging apparatus 101 cannot capture images of a part of the moving image stream at a specified frame rate (i.e., dropping frame) because of a high load applied to the CPU 201 or an increase of a memory used amount. Even in such a case, the imaging apparatus 101 can distribute the moving image stream with high distribution frequency without dropping frames, so that the client 102 can smoothly execute reproduction of the moving image.

Figure 12:
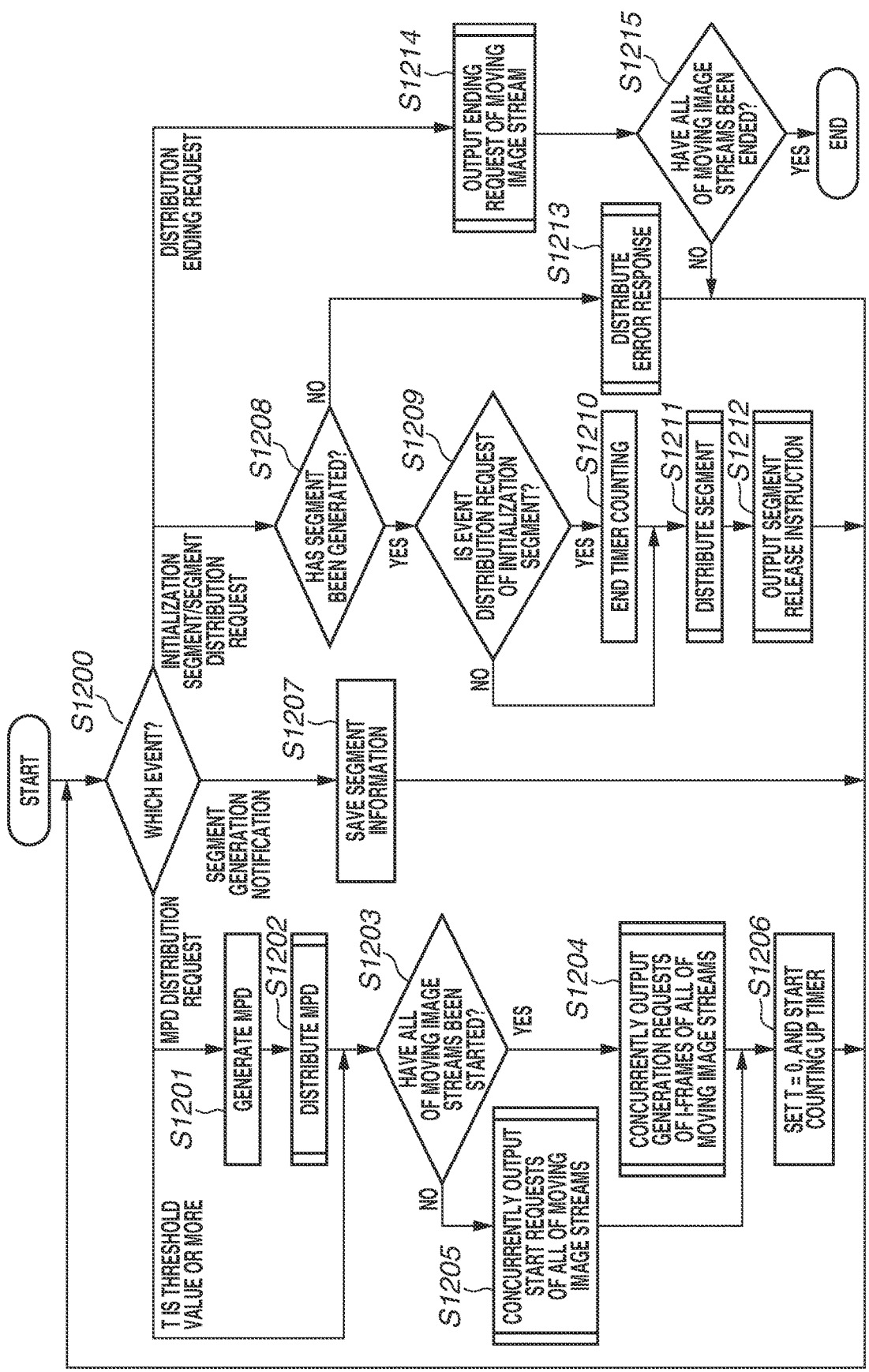
FIG. 12 is a flowchart illustrating processing performed by a distribution unit according to a fourth exemplary embodiment.

FIG. 12 is a flowchart illustrating a processing example of the distribution unit 302 according to a fourth exemplary embodiment of the present disclosure. The imaging apparatus 101 generates I-frames of all of the moving image streams in a case where the imaging apparatus 101 does not receive the distribution request event of the initialization segment from the client 102 even though a certain time period has passed after receiving the distribution request of the MPD file 400. In step S1200, the distribution unit 302 waits for occurrence of an event and switches a processing operation based on the determination of the occurring event. If the distribution unit 302 determines that the occurring event is an MPD distribution request event transmitted from the client 102 ("MPD DISTRIBUTION REQUEST EVENT" in step S1200), the processing proceeds to step S1201. If the distribution unit 302 determines that the occurring event is a segment generation notification event output from the management unit 304 ("SEGMENT GENERATION NOTIFICATION EVENT" in step S1200), the processing proceeds to step S1207. If the distribution unit 302 determines that the occurring event is an initialization segment/segment distribution event transmitted from the client 102 ("INITIALIZATION SEGMENT/SEGMENT DISTRIBUTION REQUEST EVENT" in step S1200), the processing proceeds to step S1208. If the distribution unit 302 determines that the occurring event is a distribution ending request event of a moving image stream ("DISTRIBUTION ENDING REQUEST EVENT" in step S1200), the processing proceeds to step S1214.

In step S1201, the distribution unit 302 generates the MPD file 400 collectively including information about one or a plurality of currently-distributable moving image streams. In step S1202, the distribution unit 302 distributes the MPD file 400 to the client 102. In step S1203, the distribution unit 302 determines whether all of the moving image streams described in the MPD file 400 have already been started. If the distribution unit 302 determines that all of the moving image streams have already been started (YES in step S1203), the processing proceeds to step S1204. If the distribution unit 302 determines that not all of the moving image streams have been started (NO in step S1203), the processing proceeds to step S1205.

In step S1204, the distribution unit 302 outputs generation requests of I-frames of all of the moving image streams to the imaging processing unit 303. Then, the processing proceeds to step S1206.

In step S1205, the distribution unit 302 concurrently outputs the start requests of all of the moving image streams described in the MPD file 400 to the imaging processing unit 303. Then, the processing proceeds to step S1206. Here, although the distribution unit 302 concurrently outputs the start requests of all of the moving image streams in step S1205, as illustrated in FIG. 5, the I-frame is generated as a first frame to be generated after start of the moving image stream. The start request of the moving image stream and the generation request of the I-frame may be executed sequentially instead of being executed concurrently with respect to all of the moving image streams.

For example, in step S1203, all of the moving image streams have already been started (YES in step S1203) in a case where the client 102 has already completed the processing in the first steps S1201 to S1203 and S1205. Other than the above case, all of the moving image streams have already been started if a client other than the client 102 has connected to the imaging apparatus 101 and processing in the steps S1201 to S1203 and S1205 has been completed.

In step S1206, the distribution unit 302 sets a timer count value T to 0, and starts counting up a timer. Then, the processing returns to step S1200.

In step S1200, if the distribution unit 302 determines that the timer count value T is the threshold value or more ("T IS THRESHOLD VALUE OR MORE" in step S1200), the processing proceeds to step S1203.

In step S1207, the distribution unit 302 saves the segment information including moving image frames. Then, the processing returns to step S1200.

In step S1208, the distribution unit 302 determines whether the requested initialization segment or the requested segment has already been generated. If the distribution unit 302 determines that the initialization segment or the segment has already been generated (YES in step S1208), the processing proceeds to step S1209. If the distribution unit 302 determines that the initialization segment or the segment has not been generated (NO in step S1208), the processing proceeds to step S1213.

In step S1209, the distribution unit 302 determines whether the occurring event is a distribution request event of the initialization segment. If the distribution unit 302 determines that the occurring event is a distribution request event of the initialization segment (YES in step S1209), the processing proceeds to step S1210. If the distribution unit 302 determines that the occurring event is not a distribution request event of the initialization segment (NO in step S1209), the processing proceeds to step S1211.

In step S1210, the distribution unit 302 ends counting of the timer. In step S1211, the distribution unit 302 generates a header portion of the segment and distributes the segment with the header portion attached to a data portion of the moving image frame, to the client 102 via the communication unit 305. In step S1212, the distribution unit 302 instructs the management unit 304 to release the distributed segment. Then, the processing returns to step S1200.

In step S1213, the distribution unit 302 distributes an error response to the client 102. Then, the processing returns to step S1200.

In step S1214, the distribution unit 302 outputs an ending request of the moving image stream to the management unit 304 to stop generation of segments of the moving image stream. In step S1215, the distribution unit 302 determines whether all of the moving image streams have been ended. If the distribution unit 302 determines that all of the moving image streams have been ended (YES in step S1215), the processing is ended. If the distribution unit 302 determines that not all of the moving image streams have been ended (NO in step S1215), the processing returns to step S1200. In addition, although the processing is ended when the distribution unit 302 determines that all of the moving image streams have been ended in step S1215, event determination in step S1200 may be executed continuously until the ending request is received from another processing unit of the imaging apparatus 101.

In the present exemplary embodiment, although a start request of the moving image stream and a generation request of the I-frame are concurrently output with respect to all of the moving image streams, the start request and the generation request may be sequentially output to each of the moving image streams.

As described above, the distribution unit 302 sets the timer count value T to 0 in step S1206 after outputting generation requests of moving image frames of all of the moving image streams described in the MPD file 400 encoded through the intraframe coding, to the imaging processing unit 303. Then, in a case where a waiting time for receiving the distribution request of the specific moving image stream (i.e., an initialization segment or a segment) has become a threshold value or more, the processing proceeds to step S1203. In step S1204 or S1205, the distribution unit 302 outputs generation requests of moving image frames of all of the moving image streams described in the MPD file 400 encoded through the intraframe coding to the imaging processing unit 303 again.

As described above, the imaging apparatus 101 generates the I-frames of all of the moving image streams at each threshold time interval until the imaging apparatus 101 receives a distribution request of the initialization segment after receiving a distribution request of the MPD file 400. With this configuration, even in a case where the client 102 needs a time period to transmit the distribution request of the initialization segment because of time taken for analyzing the MPD file 400, the imaging apparatus 101 can distribute a moving image to the client 102 with a short delay time.

Figure 13:
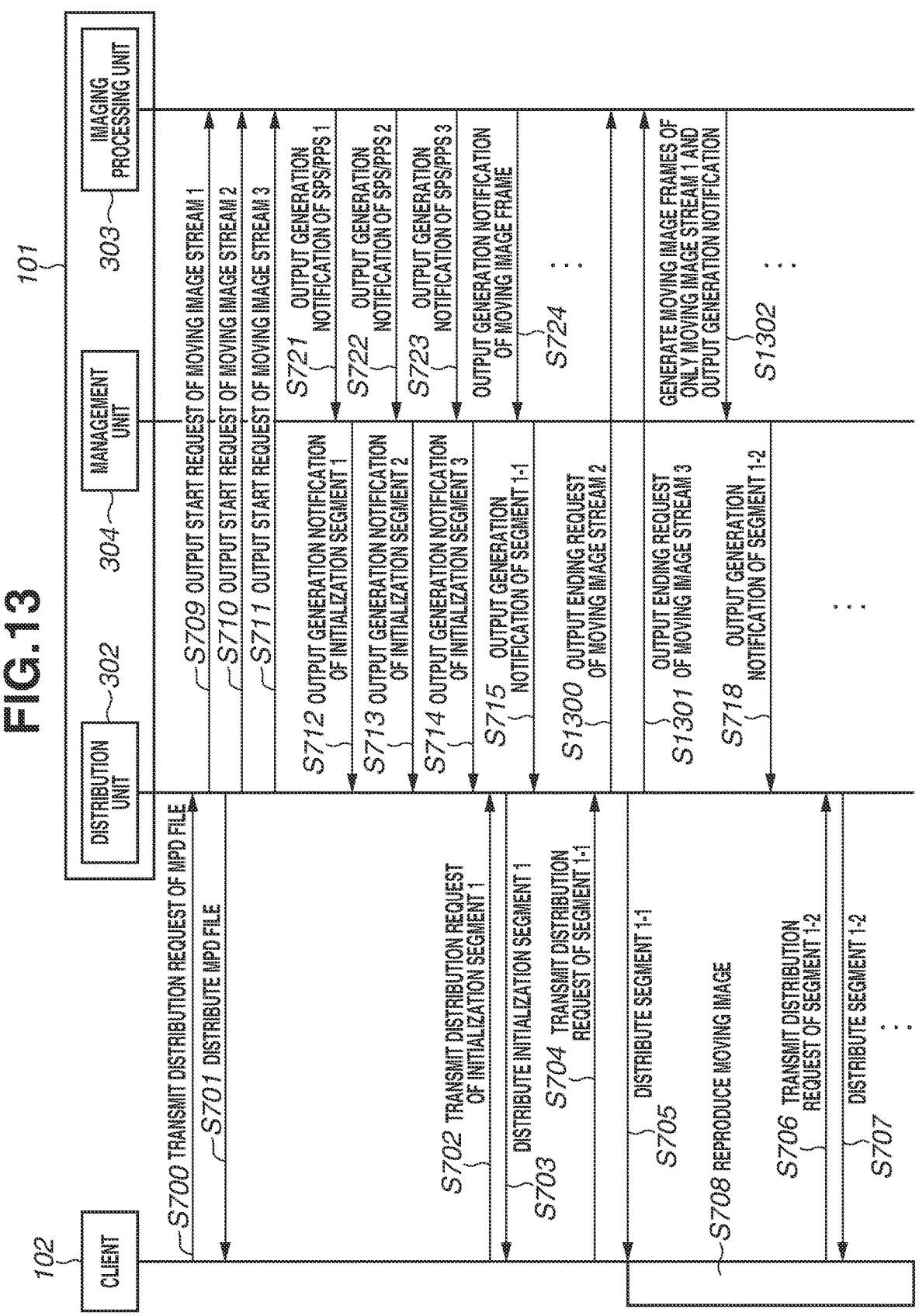
FIG. 13 is a sequence diagram illustrating processing performed between the imaging apparatus and the client.

FIG. 13 is a sequence diagram illustrating an example of a mutual interaction between the imaging apparatus 101 and the client 102 for executing distribution of a moving image according to a fifth exemplary embodiment of the present disclosure. Through the sequence, the client 102 receives a moving image distributed from the imaging apparatus 101. The present exemplary embodiment is different from the first exemplary embodiment in the sequence of the distribution unit 302 in steps S1300 and S1301, the sequence of the management unit 304 in step S718 and the subsequent steps for generating segments, and the sequence of the imaging processing unit 303 in step S1302 and the subsequent steps for generating moving image frames. Descriptions of portions common to the first and the present exemplary embodiments are omitted, and portions different in the first and the present exemplary embodiments will be described.

In step S704, the client 102 transmits a distribution request of the segment 1-1 of the moving image stream 1 to the imaging apparatus 101. The distribution unit 301 receives the distribution request of the segment 1-1 of the moving image stream 1, and specifies the moving image streams 2 and 3 from the MPD file 400 as the moving image streams other than the moving image stream 1. In step S1300, the distribution unit 302 outputs an ending request of the specified moving image stream 2 to the imaging processing unit 303 and the management unit 304. In step S1301, the distribution unit 302 outputs an ending request of the specified moving image stream 3 to the imaging processing unit 303 and the management unit 304.

The imaging processing unit 303 receives the ending requests of the moving image streams 2 and 3. Then, the imaging processing unit 303 ends generation of moving image frames of the moving image streams 2 and 3 from among generation of moving image frames executed in step S724 and the subsequent steps, and continuously executes generation of moving image frames of the moving image stream 1 in step S1302 and the subsequent steps.

The management unit 304 receives the ending requests of the moving image streams 2 and 3 in steps S1300 and S1301. Then, the management unit 304 ends generation of segments of the moving image streams 2 and 3. From the sequence in step S718 onward, the management unit 304 continuously generates segments of the moving image stream 1.

Figure 14:
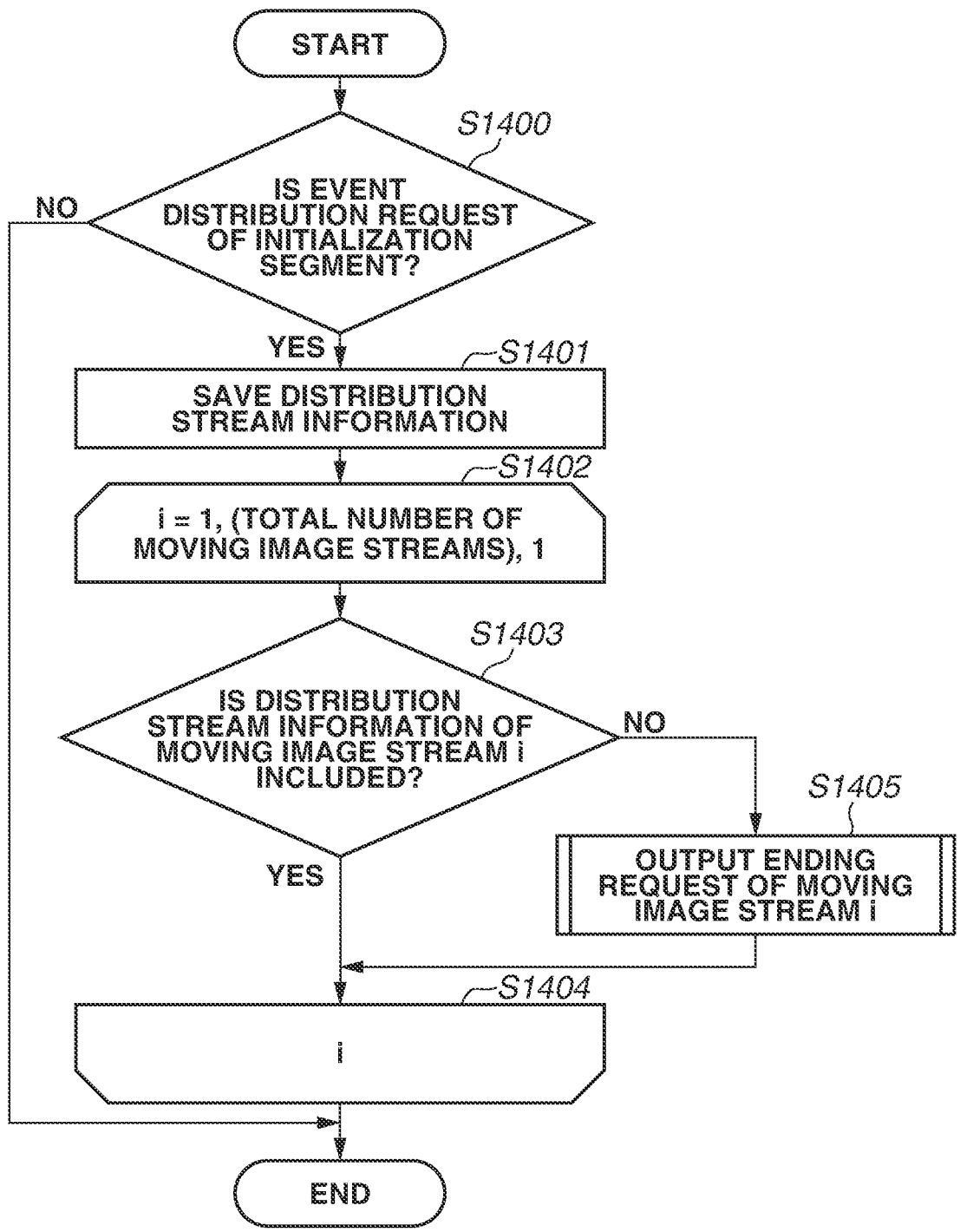
FIG. 14 is a flowchart illustrating processing performed by a distribution unit according to a fifth exemplary embodiment.

FIG. 14 is a flowchart illustrating processing executed when the distribution unit 302 receives a distribution request of an initialization segment. When a distribution request of an initialization segment is received from the client 102, the distribution unit 302 outputs an ending request of a moving image stream other than a moving image stream corresponding to that initialization segment. In the present exemplary embodiment, the distribution unit 302 additionally executes the processing in steps 1400 to S1405 at the timing between the processing of steps S807 and S808 executed by the distribution unit 302 in the first exemplary embodiment. Descriptions of portions common to the first and the present exemplary embodiments are omitted, and portions different in the first and the present exemplary embodiments will be described.

In step S1400, the distribution unit 302 determines whether the occurring event is a distribution request event of the initialization segment. If the distribution unit 302 determines that the occurring event is a distribution request event of the initialization segment (YES in step S1400), the processing proceeds to step S1401. If the distribution unit 302 determines that the occurring event is not a distribution request event of the initialization segment (NO in step S1400), the processing proceeds to step S808 in FIG. 8.

In step S1401, the distribution unit 302 saves distribution stream information including an id of the moving image stream in the temporary storage unit 301. In step S1402, the distribution unit 302 executes loop processing of a total number of moving image streams in the MPD file 400 with respect to a variable i starting from a value 1. When the processing with respect to all of the moving image streams has been completed, the distribution unit 302 ends the loop processing of the total number of moving image streams. In step S1403, the distribution unit 302 reads out the distribution stream information saved in the temporary storage unit 301 and determines whether the distribution stream information includes the id of the moving image stream i. If the distribution unit 302 determines that the distribution stream information includes the id of the moving image stream i (YES in step S1403), the processing proceeds to step S1404. If the distribution unit 302 determines that the distribution stream information does not include the id of the moving image stream i (NO in step S1403), the processing proceeds to step S1405. In step S1405, the distribution unit 302 outputs the ending request of the moving image stream i to the imaging processing unit 303, and the processing proceeds to step S1404. In step S1404, if the variable i is not equal to the total number of moving image streams, the distribution unit 302 increments the variable i, and the processing returns to step S1402. If the variable i is equal to the total number of moving image streams, the processing proceeds to step S808.

In the above-described exemplary embodiment, in step S1400, the distribution unit 302 determines whether the occurring event is the distribution request event of the initialization segment. However, there is a case where the client 102 or a client other than the client 102 transmits a distribution request of an initialization segment of a moving image stream other than the moving image stream 1 at a timing between steps S1301 and S1302. In such a case, in order to optimize a distribution delay, in step S1400, the distribution unit 302 may determine whether the occurring event is a distribution request event of the first segment.

The distribution unit 302 receives a distribution request of a specific moving image stream (an initialization segment or a segment) and outputs generation ending requests of moving image streams other than the specific moving image stream in the MPD file 400 to the imaging processing unit 303.

As described above, the imaging apparatus 101 starts all of the moving image streams when a distribution request of the MPD file 400 is received, and ends the moving image streams other than the moving image stream to be distributed when the client 102 transmits a distribution request of the initialization segment. With this configuration, the imaging apparatus 101 can distribute a moving image to the client 102 with a short delay time while reducing a memory used amount per unit time.

Figure 15:
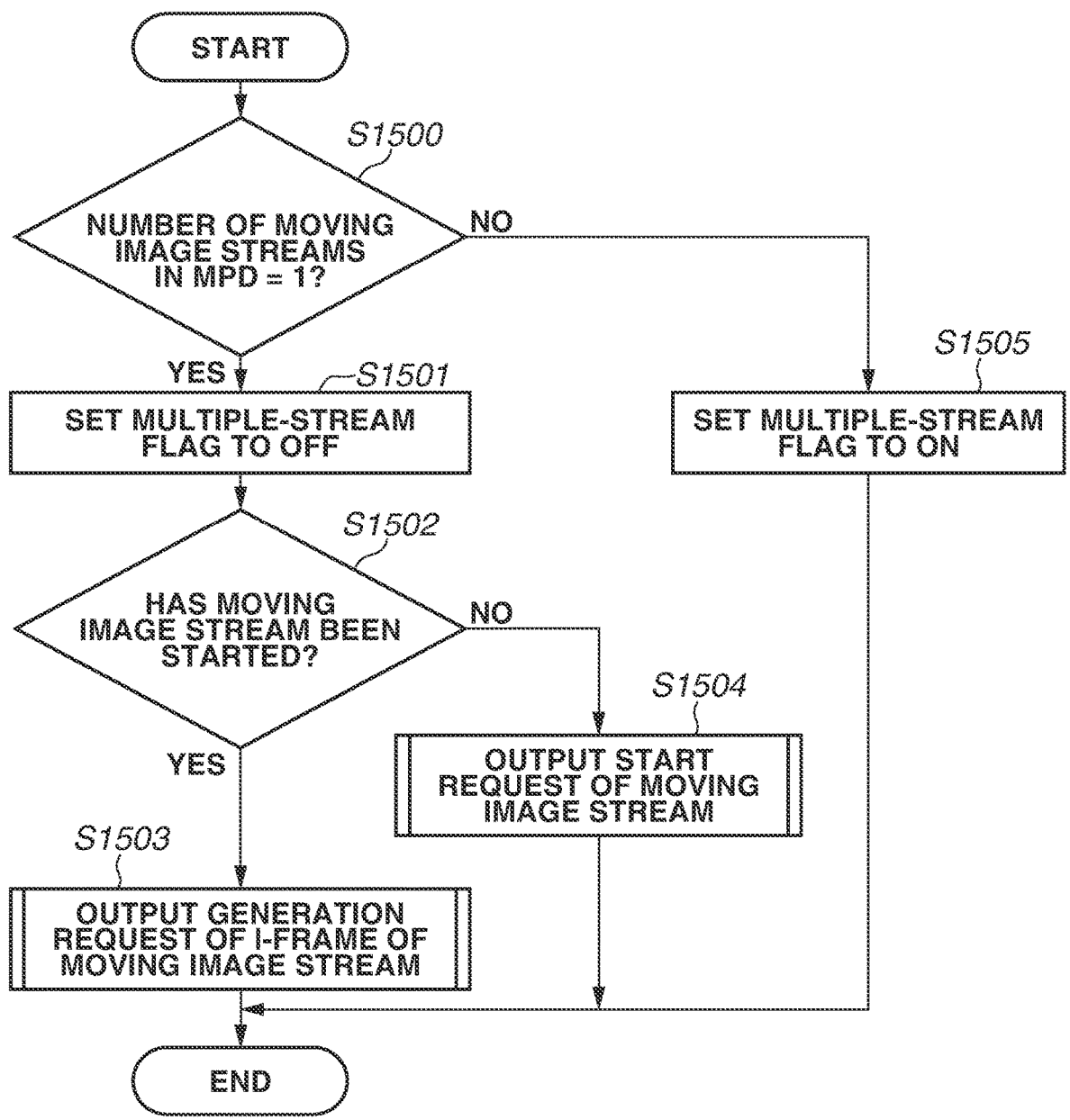
FIG. 15 is a flowchart illustrating processing performed by a distribution unit according to a sixth exemplary embodiment.

FIG. 15 is a flowchart illustrating a processing example when the distribution unit 302 according to a sixth exemplary embodiment of the present disclosure receives an MPD distribution request event. In the present exemplary embodiment, the distribution unit 302 executes the processing in steps S1500 to S1505 in place of the processing in steps S803 to S805 executed by the distribution unit 302 in the first exemplary embodiment. Descriptions of portions common to the first and the present exemplary embodiments are omitted, and portions different in the first and the present exemplary embodiments will be described.

FIG. 15 is a flowchart illustrating processing for outputting a start request of a moving image stream executed by the distribution unit 302 when the MPD file 400 defines only one moving image stream. In step S1500, the distribution unit 302 determines whether the number of moving image streams defined in the MPD file 400 is one. If the distribution unit 302 determines that the number of moving image streams defined in the MPD file 400 is one (YES in step S1500), the processing proceeds to step S1501. If the distribution unit 302 determines that the number of moving image streams defined in the MPD file 400 is not one (NO in step S1500), the processing proceeds to step S1505.

In step S1501, the distribution unit 302 sets a multiple-stream flag to OFF. In step S1502, the distribution unit 302 determines whether the moving image stream described in the MPD file 400 has been started already. If the distribution unit 302 determines that the moving image stream has already been started (YES in step S1502), the processing proceeds to step S1503. If the distribution unit 302 determines that the moving image stream has not been started (NO in step S1502), the processing proceeds to step S1504.

In step S1503, the distribution unit 302 outputs a generation request of an I-frame of the moving image stream to the imaging processing unit 303, and the processing returns to step S800 in FIG. 8. In step S1504, the distribution unit 302 outputs a start request of the moving image stream to the imaging processing unit 303, and the processing returns to step S800 in FIG. 8. At that time, the distribution unit 302 outputs the start request of the moving image stream in step S1504, and, as illustrated in FIG. 5, the I-frame is generated as a first frame to be generated after start of the moving image stream. For example, in step S1502, the moving image stream has already been started if the client 102 has already completed the processing in the first steps S1500 to S1502 and S1504. Other than the above case, the moving image stream has already been started if a client other than the client 102 has connected to the imaging apparatus 101 and the processing in steps S1500 to S1502 and S1504 has been completed. In step S1505, the distribution unit 302 sets the multiple-stream flag to ON, and the processing returns to step S800 in FIG. 8.

Figure 16:
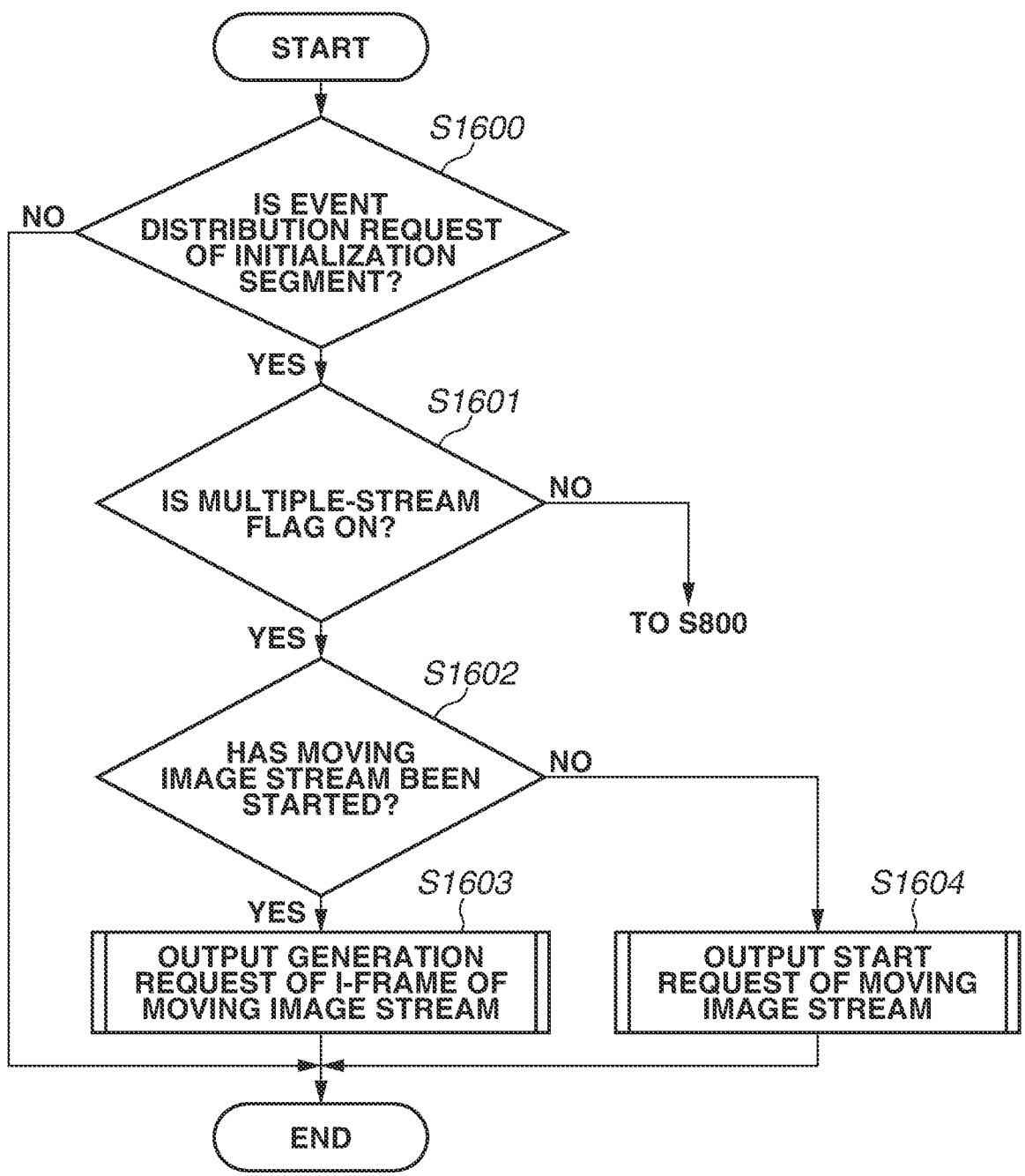
FIG. 16 is a flowchart illustrating processing performed by a distribution unit according to the sixth exemplary embodiment.

FIG. 16 is a flowchart illustrating an example of processing to be executed when the distribution unit 302 receives a distribution request event of an initialization segment. In the present exemplary embodiment, the distribution unit 302 additionally executes the processing in steps S1600 to S1604 immediately before executing the processing in step S807 executed by the distribution unit 302 in the first exemplary embodiment. The distribution unit 302 outputs a start request of a moving image stream when a distribution request event of an initialization segment is received from the client 102.

In step S1600, the distribution unit 302 determines whether the occurring event is a distribution request event of an initialization segment. If the distribution unit 302 determines that the occurring event is a distribution request event of an initialization segment (YES in step S1600), the processing proceeds to step S1601. If the distribution unit 302 determines that the occurring event is not a distribution request event of an initialization segment (NO in step S1600), the processing proceeds to step S807 in FIG. 8.

In step S1601, the distribution unit 302 determines whether the multiple-stream flag is ON. If the distribution unit 302 determines that the multiple-stream flag is ON (YES in step S1601), the processing proceeds to step S1602. If the distribution unit 302 determines that the multiple-stream flag is not ON (NO in step S1601), the processing returns to step S800 in FIG. 8.

In step S1602, the distribution unit 302 determines whether the moving image stream of the initialization segment determined in step S1600 has already been started. If the distribution unit 302 determines that the moving image stream has already been started (YES in step S1602), the processing proceeds to step S1603. If the distribution unit 302 determines that the moving image stream has not been started (NO in step S1602), the processing proceeds to step S1604.

In step S1603, the distribution unit 302 outputs to the imaging processing unit 303 a generation request of the I-frame of the moving image stream of the initialization segment determined in step S1600, and the processing proceeds to step S807 in FIG. 8. In step S1604, the distribution unit 302 outputs to the imaging processing unit 303 a start request of the moving image stream of the initialization segment determined in step S1600, and the processing proceeds to step S807 in FIG. 8. At that time, the distribution unit 302 outputs the start request of the moving image stream in step S1604, and, as illustrated in FIG. 5, the I-frame is generated as a first frame to be generated after start of the moving image stream.

As described above, if the information about one moving image stream is described in the MPD file 400, the distribution unit 302 outputs a generation request of the I-frame of the one moving image stream before receiving a distribution request of the specific moving image stream (an initialization segment or a segment). More specifically, the distribution unit 302 outputs generation requests of moving image frames of one moving image stream described in the MPD file 400 encoded through the intraframe coding, to the imaging processing unit 303.

Further, if information about a plurality of moving image streams is described in the MPD file 400, the distribution unit 302 outputs a generation request of the I-frame of the specific moving image stream after receiving a distribution request of the specific moving image stream (an initialization segment or a segment). More specifically, the distribution unit 302 outputs a generation request of a moving image frame of the specific moving image stream encoded through the intraframe coding to the imaging processing unit 303.

As described above, because the imaging apparatus 101 starts the moving image stream when the moving image stream to be distributed to the client 102 is specified, a memory used amount of the imaging apparatus 101 can be minimized.

Other Exemplary Embodiments

In the above-described exemplary embodiments, although DASH distribution is taken as an example, the present disclosure is also applicable to another adaptive streaming technique such as HLS distribution.

The present disclosure can be realized in such a manner that a program for realizing one or more functions in the above-described exemplary embodiments is supplied to a system or an apparatus via a network or a storage medium, and one or more processors in the system or the apparatus reads and executes the program. Further, the present disclosure can be also realized with a circuit (e.g., application specific integrated circuit (ASIC)) that realizes one or more functions.

In addition, the above-described exemplary embodiments are merely examples embodying the present disclosure and shall not be construed as limiting the technical range of the present disclosure. In other words, the present disclosure can be realized in diverse ways without departing from the technical spirit or main features of the present disclosure.

According to the above-described exemplary embodiments, a delay time occurring between receipt of a distribution request of a moving image stream and distribution of the moving image stream can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120595, filed Jun. 20, 2017, which is hereby incorporated by reference herein in its entirety.

What is claimed is:

1. An imaging apparatus for generating a moving image stream and for transmitting the generated moving image stream, the imaging apparatus comprising a computer executing instructions that, when executed by the computer, cause the computer to function as:
    a receiving unit configured to receive, from an external apparatus via a network, at least a request command for a MPD (Media Presentation Description) file in which information relating to a plurality of moving image streams can be indicated;
    a transmission unit configured to transmit the MPD file to the external apparatus via a network, in response to receiving the request command for the MPD file by the receiving unit;
    a coding unit configured to, in response to receiving the request command for the MPD file by the receiving unit, encode a plurality of frames each of which corresponds to each of the plurality of moving image streams indicated in the MPD file by using intraframe coding, before receiving, from the external apparatus via a network, a transmission request command for a specific moving image stream included in the plurality of moving image streams, and
    a controlling unit configured to control generation of the plurality of moving image streams,
    wherein the transmission unit is configured to transmit, to the external apparatus via a network, the specific moving image stream including the frame, which has been encoded by using intraframe coding before the transmission request command for the specific moving image stream has been received by the receiving unit, in response to receiving, by the receiving unit, the transmission request command for the specific moving image stream from the external apparatus via a network, and
    wherein the controlling unit is configured to stop generation of moving image streams other than the specific moving image stream included in the plurality of moving image streams, in response to receiving, by the receiving unit, the transmission request command for the specific moving image stream from the external apparatus via a network.

2. The imaging apparatus according to claim 1, wherein the instructions further cause the computer to function as a generation unit configured to generate a segment of the encoded frame, and
    wherein the transmission unit is configured to transmit the segment as the specific moving image stream, in response to receiving, by the receiving unit, the transmission request command for the specific moving image stream from the external apparatus via a network.

3. The imaging apparatus according to claim 1, wherein the MPD file includes information indicating at least one of a resolution, a coding method, a transmission bit rate, and a frame rate.

4. The imaging apparatus according to claim 1, wherein the transmission unit is configured to simultaneously or sequentially request, to the coding unit, generation of the plurality of frames each of which corresponds to each of the plurality of moving image streams.

5. The imaging apparatus according to claim 1, wherein the transmission unit is configured to request, to the coding unit, generation of the plurality of frames each of which corresponds to each of the plurality of moving image streams, in an order from a moving image stream of a lowest transmission bit rate.

6. The imaging apparatus according to claim 1, wherein the transmission unit is configured to request, to the coding unit, generation of the plurality of frames each of which corresponds to each of the plurality of moving image streams, in an order from a moving image stream of a highest transmission frequency.

7. The imaging apparatus according to claim 4, wherein, in a case where a waiting time for receiving the transmission request command for the specific moving image stream is greater than or equal to a threshold value after the transmission unit requests the generation of the frames to the coding unit, the transmission unit requests the generation of frames to the coding unit again.

8. A processing method of an imaging apparatus for generating a moving image stream and for transmitting the generated moving image stream, comprising:
    receiving, from an external apparatus via a network, at least a request command for a MPD (Media Presentation Description) file in which information relating to a plurality of moving image streams can be indicated;
    transmitting the MPD file to the external apparatus via a network, in response to receiving the request command for the MPD file;
    encoding a plurality of frames each of which corresponds to each of the plurality of moving image streams indicated in the MPD file by using intraframe coding, before a transmission request for a specific moving image stream included in the plurality of moving image streams is received, from the external apparatus via a network, when the request command for the playlist is received, and
    controlling generation of the plurality of moving image streams,
    transmitting, to the external apparatus via a network, the specific moving image stream including the frame, which has been encoded by using the intraframe coding before the transmission request command for the specific moving image stream has been received, in response to receiving the transmission request command for the specific moving image stream from the external apparatus via a network, and stopping generation of moving image streams other than the specific moving image stream included in the plurality of moving image streams, in response to receiving the transmission request command for the specific moving image stream from the external apparatus via a network.

9. A non-transitory computer-readable storage medium storing a program for causing a computer to execute a method, the method comprising:

receiving, from an external apparatus via a network, at least a request command for a MPD (Media Presentation Description) file in which information relating to a plurality of moving image streams can be indicated;

transmitting the MPD file to the external apparatus via a network, in response to receiving the request command for the MPD file;

encoding a plurality of frames each of which corresponds to each of the plurality of moving image streams indicated in the MPD file by using intraframe coding, before a transmission request command for a specific moving image stream included in the plurality of moving image streams is received, from the external apparatus via a network, when the request command for the playlist is received by the imaging apparatus, and controlling generation of the plurality of moving image streams, transmitting, to the external apparatus via a network, the specific moving image stream including the frame, which has been encoded by using intraframe coding before the transmission request command for the specific moving image stream has been received, in response to receiving the transmission request command for the specific moving image stream from the external apparatus via a network, and stopping generation of moving image streams other than the specific moving image stream included in the plurality of moving image streams, in response to receiving the transmission request command for the specific moving image stream from the external apparatus via a network.

* * * * *